US012668714B2

(12) United States Patent
Lee et al.

(10) Patent No.: US 12,668,714 B2
(45) Date of Patent: Jun. 30, 2026

(54) PHENOLIC RESIN AND COATING COMPOSITIONS USING THE SAME

(71) Applicant: PPG Industries Ohio, Inc., Cleveland, OH (US)

(72) Inventors: Se Ryeon Lee, Mars, PA (US); Ross A. Moretti, Pittsburgh, PA (US); Dennis A. Simpson, Sarver, PA (US); Hiu Yan Cheng, Allison Park, PA (US); Randy E. Daughenbaugh, Monroeville, PA (US); Michael Olah, Pittsburgh, PA (US); Christophe Rene Gaston Grenier, Pittsburgh, PA (US); Inanllely Y. Gonzalez, Cleveland, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 586 days.

(21) Appl. No.: 17/997,130

(22) PCT Filed: Apr. 28, 2021

(86) PCT No.: PCT/US2021/029563
§ 371 (c)(1),
(2) Date: Oct. 26, 2022

(87) PCT Pub. No.: WO2021/222358
PCT Pub. Date: Nov. 4, 2021

(65) Prior Publication Data
US 2023/0167329 A1 Jun. 1, 2023

Related U.S. Application Data

(60) Provisional application No. 63/018,241, filed on Apr. 30, 2020.

(51) Int. Cl.
*C09D 133/06* (2006.01)
*B65D 83/38* (2025.01)

(52) U.S. Cl.
CPC ......... *C09D 133/066* (2013.01); *B65D 83/38* (2013.01)

(58) Field of Classification Search
None
See application file for complete search history.

(56) References Cited

U.S. PATENT DOCUMENTS

| | | |
|---|---|---|
| 4,404,334 A | 9/1983 | Bornstein |
| 4,443,623 A | 4/1984 | Photis |
| 4,507,339 A | 3/1985 | Karas et al. |
| 4,528,320 A | 7/1985 | Ley et al. |
| 4,793,867 A | 12/1988 | Charles et al. |
| 4,853,431 A | 8/1989 | Miller |
| 5,143,954 A | 9/1992 | Novak et al. |
| 5,588,989 A | 12/1996 | Vonk et al. |
| 5,753,746 A | 5/1998 | Heinz et al. |

| | | |
|---|---|---|
| 7,749,368 B2 | 7/2010 | McMurdie et al. |
| 8,614,286 B2 | 12/2013 | Zhou et al. |
| 8,673,091 B2 | 3/2014 | McMillen et al. |
| 11,091,656 B2 | 8/2021 | Singer |
| 2005/0250042 A1 | 11/2005 | Sheehan et al. |
| 2006/0091577 A1 | 5/2006 | Shen et al. |
| 2006/0122330 A1 | 6/2006 | Wu et al. |
| 2006/0229415 A1 | 10/2006 | Boyer et al. |
| 2008/0107996 A1 | 5/2008 | Rosenheck et al. |
| 2008/0194790 A1 | 8/2008 | Van Benthem et al. |
| 2009/0326164 A1 | 12/2009 | Boonen |
| 2010/0062668 A1 | 3/2010 | Goldstein et al. |
| 2010/0209723 A1 | 8/2010 | Ono et al. |
| 2010/0247941 A1 | 9/2010 | Didier et al. |
| 2010/0330376 A1 | 12/2010 | Huffman et al. |
| 2011/0086988 A1* | 4/2011 | Van Benthem .......... C08G 8/24 525/451 |
| 2011/0112260 A1 | 5/2011 | Janssen et al. |
| 2011/0313091 A1 | 12/2011 | Foley et al. |
| 2011/0315591 A1 | 12/2011 | Stenson et al. |
| 2012/0122694 A1 | 5/2012 | Mues et al. |
| 2013/0203642 A1 | 8/2013 | Bauer et al. |
| 2014/0353539 A1 | 12/2014 | Didier |
| 2016/0122581 A1 | 5/2016 | You |
| 2016/0312010 A1 | 10/2016 | Alavi |
| 2016/0355631 A1 | 12/2016 | Zhongshun et al. |
| 2019/0211486 A1 | 7/2019 | Hjelmgaard |
| 2021/0087327 A1 | 3/2021 | Priebe |

FOREIGN PATENT DOCUMENTS

| | | |
|---|---|---|
| CN | 1065106 A | 10/1992 |
| CN | 101956322 A1 | 1/2011 |
| CN | 101977951 A | 2/2011 |
| CN | 104962227 A1 | 10/2015 |
| CN | 104194547 B | 5/2016 |
| EP | 0360248 A2 | 3/1990 |
| EP | 0360383 A2 | 3/1990 |
| KR | 101050998 B1 | 7/2011 |
| WO | 2007140940 A1 | 12/2007 |
| WO | 2009115545 A1 | 9/2009 |
| WO | 2015031418 A1 | 3/2015 |
| WO | 2015032458 A1 | 3/2015 |
| WO | 2015032733 A1 | 3/2015 |
| WO | 2015086034 A1 | 6/2015 |

(Continued)

OTHER PUBLICATIONS

Anonymous, "Double your sustainability Water-based resins for industrial metal coatings (Acronal, Luhydran and Joncryl)", Jan. 1, 2021, p. 1-16.

(Continued)

*Primary Examiner* — Yan Lan

(57) ABSTRACT

Coating compositions comprising a phenolic resin and a film-forming resin having functional groups that are reactive with the functionality of the phenolic resin are disclosed herein. The phenolic resin comprises a phenol group containing compound and a glyoxylic acid containing compound. Such phenolic resins may be used as formaldehyde-free crosslinkers in coating compositions and such coating compositions may be used on substrates comprising a non-porous material, such as metal, glass, and/or plastic. Also disclosed are methods of coating a substrate and coated substrates, including food and/or beverage containers.

21 Claims, No Drawings

(56)                    References Cited

FOREIGN PATENT DOCUMENTS

| WO | 2015086035 | A1 | 6/2015 |
| WO | 2015086073 | A1 | 6/2015 |
| WO | 2015086074 | A1 | 6/2015 |
| WO | 2018050248 | A1 | 3/2018 |
| WO | 2019060247 | A1 | 3/2019 |

OTHER PUBLICATIONS

Fischer, "The Toxic Effects of Formaldehyde and Formalin", Journal of Experimental Medicine, vol. 6, No. 4-6, Feb. 1, 1905, p. 487-518.
Anonymous, "Formaldehyde", Apr. 1, 2011, p. 1-2.
Anonymous, "Worker exposure to formaldehyde and formaldehyde releasers", Jul. 12, 2019, p. 1-59.
Kelly et al, "Emission Rates of Formaldehyde from Materials and Consumer Products Found in California Homes", Washington, DC, Jan. 1, 1999, p. 81-88.
Salthammer, "Data on formaldehyde sources, formaldehyde concentrations and air exchange rates in European housings", Data in Brief, vol. 22, Feb. 1, 2019, p. 400-435.
Prodn. of bis(hydroxyphenyl) acetic acid and a hydroxy:mandelic acid—comprises reacting glyoxylic acid with a phenol in presence of miner acid, Derwent, 1981.
Hoefnagel et al, "Metal Ion Catalysis in the Hydroxyalkylation of Phenol With Glyoxylic Acid#", Recueil des travaux chimiques des Pays-Bas, Elsevier Science Publishers, Amsterdam, NL, vol. 107, No. 3, Mar. 1, 1988, p. 242-247.
International Search Report and Written Opinion received for PCT Application Serial No. PCT/US2021/029563 dated Jul. 28, 2021, 31 pages.

* cited by examiner

PHENOLIC RESIN AND COATING COMPOSITIONS USING THE SAME

FIELD

The disclosure is directed to a coating composition for a substrate comprising a phenolic resin, and a film-forming resin having functional groups that are reactive with the functionality of the phenolic resin, wherein the substrate comprises a non-porous material, such as metal, glass, and/or plastic.

BACKGROUND

Coatings are applied to numerous substrates to provide protective and/or decorative qualities. These coatings are often thermoset coatings, which cure upon reaction of a functional resin with a crosslinking material having functionality that reacts with the functionality of the resin. Crosslinkers are often formaldehyde based. Many industries are interested in reducing if not eliminating formaldehyde in coatings. Accordingly, coatings that are substantially, essentially or completely free of formaldehyde are desired.

SUMMARY

The present invention provides a coating composition for a substrate comprising:
  a. a film-forming resin having a number average molecular weight (Mn) of at least 1000; and
  b. a phenolic resin comprising a reaction product of a reaction mixture comprising
    i. a phenol group containing compound and
    ii. a glyoxylic acid containing compound;
wherein the film-forming resin has functional groups that are reactive with the functionality of the phenolic resin, wherein the substrate comprises metal, glass and/or plastic, and wherein the coating composition is substantially free of formaldehyde.

There is also provided a substrate coated on at least a portion thereof with a coating, the coating being derived from a coating composition, the coating composition comprising:
  a. a film-forming resin having a number average molecular weight (Mn) of at least 1000; and
  b. a phenolic resin comprising a reaction product of a reaction mixture comprising
    i. a phenol group containing compound; and
    ii. a glyoxylic acid containing compound;
wherein the film-forming resin has functional groups which are reactive with the functionality of the phenolic resin, wherein the substrate comprises metal, glass and/or plastic, and wherein the coating composition is substantially free of formaldehyde.

There is also provided a food and/or beverage packaging comprising a substrate coated on at least a portion thereof with a coating, the coating being derived from a coating composition, the coating composition comprising:
  a. a film-forming resin having a number average molecular weight (Mn) of at least 1000; and
  b. a phenolic resin comprising a reaction product of a reaction mixture comprising
    i. a phenol group containing compound; and
    ii. a glyoxylic acid containing compound;
wherein the film-forming resin has functional groups which are reactive with the functionality of the phenolic resin, wherein the substrate comprises metal, glass and/or plastic, and wherein the coating composition is substantially free of formaldehyde.

There is also provided a method of coating a substrate, the method comprising applying to at least a portion of the substrate a coating composition comprising:
  a. a film-forming resin having a number average molecular weight (Mn) of at least 1000; and
  b. a phenolic resin comprising a reaction product of a reaction mixture comprising
    i. a phenol group containing compound; and
    ii. a glyoxylic acid containing compound;
wherein the film-forming resin has functional groups which are reactive with the functionality of the phenolic resin, wherein the substrate comprises metal, glass and/or plastic, and wherein the coating composition is substantially free of formaldehyde; and thermally curing the coating composition.

There is also provided a method of coating a food and/or beverage container, the method comprising applying to at least a portion of a metal substrate, prior to or after forming the metal substrate into a food or beverage container or portion thereof, a coating composition comprising:
  a. a film-forming resin having a number average molecular weight (Mn) of at least 1000; and
  b. a phenolic resin comprising a reaction product of a reaction mixture comprising
    i. a phenol group containing compound; and
    ii. a glyoxylic acid containing compound;
wherein the film-forming resin has functional groups which are reactive with the functionality of the phenolic resin, wherein the substrate comprises metal, glass and/or plastic, and wherein the coating composition is substantially free of formaldehyde; and thermally curing the coating composition.

DETAILED DESCRIPTION

Phenolic Resin

The present invention relates to a crosslinking material, in particular, a phenolic resin comprising a reaction product of a reaction mixture comprising (i) a phenol group containing compound, and (ii) a glyoxylic acid containing compound. A phenolic resin is described herein comprising a reaction product of a reaction mixture comprising
  a. a phenol group containing compound; and
  b. a glyoxylic acid containing compound, wherein the phenolic resin is substantially free of formaldehyde.

The phenol group containing compound may comprise any suitable compound that includes a phenol group. Suitable phenol group containing compounds will be known to a person skilled in the art. Examples of such suitable phenol group containing compounds include, but are not limited to, phenol, trisphenol, tetraphenol, resorcinol, hydroquinone, m-cresol, 2-naphthol, guaiacol, 3-methoxyphenol, an aromatic alcohol such as (2, 3, or 4-)cresol, bisphenol-A, bisphenol-F, catechol, phloroglucinol, pyrogallol, hydroxyhydroquinone, hydroxymandelic acid, salicylaldehyde, dihydroxynaphthalene, novolac resins, thymol, quercetin, and/or a derivative thereof. The phenol group containing compound may be a resol phenolic resin or a novolac resin, such as those commercially available. The phenol group may be a monofunctional or a multifunctional/polymeric phenol. For example, the phenol group containing compound may be resorcinol and/or hydroquinone.

The term "glyoxylic acid containing compound" as used herein refers to any compound that includes glyoxylic acid, a precursor thereof and/or a derivative thereof. Precursors of glyoxylic acid may include, without limitation, 2,2-dihydroxyacetic acid, 2-hydroxy-2-methoxyacetic acid, 2,2-dimethoxyacetic acid, 2-hydroxy-2-ethoxyacetic acid, 2,2-diethoxyacetic acid, 2-hydroxy-2-butoxyacetic acid, 2,2-dibutoxyacetic acid, 2-iminoacetic acid, and 2-(methylimino)acetic acid.

The term "derivative", as used herein, includes a salt thereof, an ester thereof, a free acid form thereof, a free base form thereof, a solvate thereof, a hydrate thereof, an N-oxide thereof, a clathrate thereof, a stereoisomer thereof, a geometric isomer thereof, a tautomer thereof, a mixture of tautomers thereof, an enantiomer thereof, a diastereomer thereof, a racemate thereof, a mixture of stereoisomers thereof, and/or an isotope thereof (e.g., tritium, deuterium). The glyoxylic acid may comprise glyoxylic acid, esters, and/or salts thereof. The glyoxylic acid containing compound may comprise glyoxylic acid, acetals, hemiacetals, esters, glyoxylate esters, glyoxylate hydrate, glyoxylate hemiacetals, glyoxylate imides, glyoxylate acetals, and/or salts thereof.

The reaction mixture may also further comprise a monoaldehyde or a ketone. The monoaldehyde may comprise acetaldehyde, crotonaldehyde, benzaldehyde, butyraldehyde, cyclohexanecarboxaldehyde, citral, furfural, isobutanal, nonanal, octanal, pentanal, propanal, vanillin, cinnamic aldehyde, salicyaldehyde, and/or octanal. The ketone may comprise pyruvate ester, ethyl pyruvate, acetone, 2,3-butanedione, 2,3-pentanedione, 2,3-hexanedione, 1,2-diphenylethane-1,2-dione, aliphatic ketone, and/or acetone. For example, the ketone may be a diketone, such as 2,3-butanedione, 2,3-pentanedione, and/or 2,3-hexanedione.

The phenolic resin may be self-crosslinkable, that is, it will crosslink with itself. The phenolic resin may be self-crosslinkable without any additional reactants, such as, without limitation, a crosslinker. Self-crosslinkability of the phenolic resin, as disclosed here, was determined using a modified method based on ASTM D 5402-06 with an MEK double rub after oven bake as described in examples below. For example, sufficient self-crosslinkability of the phenolic resin may be indicated by achieving 10 or greater, 25 or greater, 30 or greater, 50 or greater or at times, 100 or greater MEK double rubs using the method in examples below. A skilled artisan would understand that a higher number of MEK double rubs would indicate more self-crosslinking.

The phenolic resin may form a continuous or semi-continuous film forming layer on a substrate surface. A "continuous layer" refers to an unbroken layer of film formed on the whole substrate surface. A "semi-continuous layer" is one that is broken; that is, the layer is not continuous across the whole surface.

The phenol group containing compound may comprise at least two hydroxyl groups. The phenol group containing compound may comprise at least three hydroxyl groups or at least four hydroxyl groups. Without intending to be bound by theory, it is believed that additional hydroxyl groups on the phenol group containing compound can activate additional positions on the phenolic ring and/or increase the reactivity of the ortho and para sites on the phenolic ring. Accordingly, one skilled in the art can appreciate that the position of the hydroxyl groups may also increase the reactivity of the phenol group containing compound.

The molar ratio of the glyoxylic acid containing compound to the phenol group containing compound may be less than 4:1, such as less than 3:1, less than 2.5:1, less than 2:1, less than 1.5:1, less than 1.2:1, at least 1:1, and/or a range between any two of these ratios (e.g. 1:1 to 3:1). If the resin comprises monoaldehydes and/or mono-ketones in addition to glyoxylic acid, the molar ratio of the glyoxylic acid containing compound and the monoaldehydes and/or mono-ketones to the phenol group containing compound may be less than 4:1, such as less than 3:1, less than 2.5:1, less than 2:1, less than 1.5:1, less than 1.2:1, at least 1:1, and/or a range between any two of these ratios (e.g. 1:1 to 3:1).

The ratio of the glyoxylic acid containing compound to the phenol group containing compound in the phenolic resin may also be determined based on the ratio of reactive equivalents. To calculate the ratio of reactive equivalents of the glyoxylic acid group containing compound and any included additional aldehyde and/or ketone to the phenolic group containing resin, one skilled in the art would understand that each aldehyde group, ketone group or derivative thereof in the phenolic resin contains two reactive equivalents and phenol group containing compounds contain one reactive equivalent per open ortho or para site. The ratio of reactive equivalents of glyoxylic acid group containing compound, aldehydes, ketones to reactive equivalents of phenol containing compounds in the phenolic resin may be less than 3:1, less than 2:1, less than 1.5:1, less than 1.25:1, less than 1:1, at least 0.75:1, and/or a range between any two of these ratios (e.g. 0.75:1 to 3:1).

The phenolic resin may be stable at ambient temperature for at least 3 days, at least 7 days, at least 9 days, at least 14 days, or at least 21 days. Stability is determined by a less than 15% change in viscosity of the resin formulation over time. Viscosity of the phenolic resin crosslinkers were measured using Brookfield Engineering Lab CAP 2000+ viscometer at room temperature.

Ambient conditions generally refer to room temperature and humidity conditions or temperature and humidity conditions that are typically found in the area in which the phenolic resin, or a composition comprising such resin, is applied to a substrate, e.g., at 10° C. to 40° C. and 5% to 80% relative humidity, such as at 20° C. to 40° C. and 20% to 80% relative humidity, while elevated temperatures are temperatures that are above ambient temperature.

The phenolic resin may have any suitable weight average molecular weight (Mw). The phenolic resin may have an Mw of greater than 1,500, greater than 2,000, less than 10,000, less than 5,000 or a range between any two of these values. The phenolic resin may have an Mw of 200 to 250,000 Daltons (Da=g/mole), such as 1,000 to 150,000 Da, such as 1,500 to 100,000 Da, such as from 2,000 to 50,000 Da, such as 2,500 to 25,000 Da, such as 3,000 to 20,000 Da, such as 1,000 to 10,000 Da, or such as 4,000 to 15,000 Da.

The phenolic resin may have an Mw from 200 to 250,000 Da, such as from 200 to 150,000 Da, such as from 200 to 100,000 Da, such as from 200 to 50,000 Da, such as from 200 to 25,000 Da, such as from 200 to 20,000 Da, or such as from 200 to 15,000 Da, such as from 500 to 150,000 Da, such as from 500 to 100,000 Da, such as from 500 to 50,000 Da, such as from 500 to 25,000 Da, such as from 500 to 20,000 Da, or such as from 500 to 15,000 Da. The phenolic resin may have an Mw from 1,000 to 250,000 Da, such as from 1,000 to 150,000 Da, such as from 1,000 to 100,000 Da, such as from 1,000 to 50,000 Da, such as from 1,000 to 25,000 Da, such as from 1,000 to 20,000 Da, or such as from 1,000 to 15,000 Da. The phenolic resin may have an Mw from 1,500 to 250,000 Da, such as from 1,500 to 150,000 Da, such as from 1,500 to 100,000 Da, such as from 1,500 to 50,000 Da, such as from 1,500 to 25,000 Da, such as from 1,500 to 20,000 Da, or such as from 1,500 to 15,000 Da. The phenolic resin may have an Mw from 2,000 to 250,000 Da, such as from 2,000 to 150,000 Da, such as from 2,000 to 100,000 Da, such as from 2,000 to 50,000 Da, such as from 2,000 to 25,000 Da, such as from 2,000 to 20,000 Da, or such as from 2,000 to 15,000 Da. The phenolic resin may have an Mw from 2,500 to 250,000 Da, such as from 2,500 to 150,000 Da, such as from 2,500 to 100,000 Da, such as from 2,500 to 50,000 Da, such as from 2,500 to 25,000 Da, such as from 2,500 to 20,000 Da, or such as from 2,500 to 15,000 Da. The phenolic resin may have an Mw from 3,000 to 250,000 Da, such as from 3,000 to 150,000 Da, such as from 3,000 to 100,000 Da, such as from 3,000 to 50,000 Da, such as from 3,000 to 25,000 Da, such as from 3,000 to 20,000 Da, or such as from 3,000 to 15,000 Da. The phenolic resin may have an Mw from 4,000 to 250,000 Da, such as from 4,000 to 150,000 Da, such as from 4,000 to 100,000 Da, such as from 4,000 to 50,000 Da, such as from 4,000 to 25,000 Da, such as from 4,000 to 20,000 Da, or such as from 4,000 to 15,000 Da.

As reported herein, the Mw may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". Gel permeation chromatography used to characterize the polymer samples, was performed using a Waters 2695 separation module with a Waters 410 differential refractometer (RI detector). Dimethylformamide (DMF) with 0.05M Lithium bromide (LiBr) was used as the eluent at a flow rate of 0.5 ml min-1, and one. Shodex Asahipak GF-510HQ, (300×7.5 mm, 5 μm) column was used for separation at temperature 40° C. using a sample concentration of 2 mg/ml.

The phenolic resin may be substantially free, may be essentially free or may be completely free of glyoxal. Glyoxal or derivatives thereof mentioned above may not be added to the composition intentionally but may be present in trace amounts because of unavoidable contamination from the environment. "Substantially free" refers to coating compositions, or components thereof, containing less than 1000 parts per million (ppm) of any of the compounds or derivatives thereof mentioned above. "Essentially free" refers to coating compositions, or components thereof, containing less than 100 ppm of any of the compounds or derivatives thereof mentioned above. By "completely free" refers to coating compositions, or components thereof, containing less than 20 parts per billion (ppb) of any of the compounds or derivatives thereof mentioned above.

The phenolic resin may be substantially free, may be essentially free or may be completely free of formaldehyde. The amount of free formaldehyde may be measured, for example, using ASTM D5910 or the method disclosed below. Values for free formaldehyde disclosed herein were determined using the following method:

A set of calibration standards, prepared by diluting 37% aqueous formaldehyde, and the samples to be measured were derivitized with a previously prepared solution containing 0.2 g of 2,4-dinitrophenylhydrazine (DNPH) and 1 mL of 85% phosphoric acid made up to a final volume of 100 mL with acetonitrile (ACN). The derivitization of the standards was performed by mixing 50 μL of each standard with 2 mL of derivitization solution. The samples were derivitized in similar manner by mixing 50 μL of a 20 mg/mL solution of the sample in acetonitrile with 2 mL of the derivitization solution. The samples and the standards were allowed to react with the derivitization solution for 10 min at ambient temperature before being filtered through a 0.45 μm cartridge filter into HPLC injection vials. The vials were then analyzed by HPLC using a Restek Pinnacle II C18 150×4.6 mm×5μ column with a diode array detector set to a wavelength of 360 nm. A convenient gradient at a flow of 1.5 mL/min of water to acetonitrile was used to give a well-resolved peak with adequate retention for the derivitized formaldehyde (e.g. 90% water to 98% ACN over 25 min). The concentrations of free formaldehyde in the sample solutions were then determined using the calibration curve prepared from the standards, which were in turn used to calculate the amount of free formaldehyde in the original samples.

"Substantially free" of formaldehyde refers to phenolic resins, or components thereof, containing less than 1000 parts per million (ppm) of formaldehyde using one of the above methods. "Essentially free" refers to phenolic resins, or components thereof, containing less than 100 ppm of formaldehyde using one of the above methods. "Completely free" refers to phenolic resins, or components thereof, containing less than 20 parts per billion (ppb) of formaldehyde using one of the above methods.

Coating Composition

A coating composition is described herein comprising:
a. a film-forming resin; and
b. a phenolic resin comprising a reaction product of a reaction mixture comprising
    iii. a phenol group containing compound; and
    iv. a glyoxylic acid;
wherein the film-forming resin has functional groups which are reactive with the functionality of the phenolic resin, and wherein the coating composition is substantially free of formaldehyde.

The coating composition may have a pH of 5 to 9. For example, the coating composition may have a pH greater than 4, greater than 5, greater than 6, less than 10, less than 9, less than 8, or in a range between any two of these values.

As used herein, the term "film forming resin" refers to one or more film-forming resins that can form a self-supporting continuous or semi-continuous film on at least a horizontal surface of a substrate (e.g., a metal, glass, or plastic) upon removal of any diluents or carriers present in the composition or upon curing at elevated temperature. The film-forming composition may comprise a thermosetting film forming resin or a thermoplastic film forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or cross-linking reactions also may be carried out under ambient conditions. Once cured or crosslinked, a thermosetting resin will not melt upon the application of heat and is insoluble in solvents. As used herein, the term "thermoplastic" refers to resins that comprise polymeric components that are not joined by covalent bonds and thereby can undergo liquid flow upon heating and are soluble in solvents.

A film-forming resin can be used in, for example, at least one of an automotive original equipment manufacturer coating composition, an automotive refinish coating composition, an industrial coating composition, an architectural coating composition, a coil coating composition, a packaging coating composition, a marine coating composition, an aerospace coating composition, and the like.

A film-forming resin may have functional groups that are reactive with the phenolic resin. The film-forming resin in the coating compositions described herein may be selected from any of a variety of polymers well-known in the art. The film-forming resin may be selected from, for example, an acrylic polymer, a polyester polymer, a polyurethane polymer, a polyamide polymer, a polyether polymer, a polysiloxane polymer, an epoxy mimic resin, an epoxy based resin, copolymers thereof, and mixtures thereof. The film-forming resin may comprise a polyether polymer, a polyester polymer, an acrylic polymer, a polyolefin polymer, or a combination thereof. The film-forming resin may comprise an acrylic polymer. The epoxy based resin may comprise epoxy and Bisphenol A, F, S based resin. Generally, these polymers may be any polymers of these types made by any method known to those skilled in the art. The functional groups on the film-forming resin may be selected from any of a variety of reactive functional groups, including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

The film-forming resin may be present in any suitable amount. The film-forming resin may be present in an amount of greater than 5 wt %, less than 99.5 wt %, or greater than 50 wt %, based on the weight of the film-forming resin and the phenolic resin. The film-forming resin may be present in an amount of up to 99.5 wt %, based on the weight of the film-forming resin and the phenolic resin. The film forming resin may be in an amount of 5 wt % to 99.5 wt %, based on the weight of the film-forming resin and the phenolic resin, such as from 5 wt % to 99.5 wt %, such as from 15 wt % to 99.5 wt %, such as from 20 wt % to 99.5 wt %, such as from 30 wt % to 99.5 wt %, such as from 35 wt % to 99.5 wt %, such as from 40 wt % to 99.5 wt %, such as from 45 wt % to 99.5 wt %, such as from 50 wt % to 99.5 wt %, such as from 55 wt % to 99.5 wt %, such as from 60 wt % to 99.5 wt %, such as from 75 wt % to 99.5 wt %, such as from 50 wt % to 80 wt %, such as from 50 wt % to 75 wt %, or such as from 65 wt % to 75 wt %.

The film-forming resin may have any suitable number average molecular weight (Mn). The film-forming resin may have an Mn from 500 to 250,000 Daltons (Da=g/mole), such as from 1,000 to 150,000 Da, such as from 1,000 to 100,000 Da, such as from 1,000 to 50,000 Da, such as from 1,000 to 25,000 Da, such as from 1,000 to 20,000 Da, such as from 1,000 to 10,000 Da, such as from 1,000 to 8,000, or such as from 1,000 to 5,000 Da.

The film-forming resin may have an Mn from 500 to 250,000 Da, such as from 500 to 150,000 Da, such as from 500 to 100,000 Da, such as from 500 to 50,000 Da, such as from 500 to 25,000 Da, such as from 500 to 20,000 Da, such as from 500 to 10,000 Da, or such as from 500 to 5,000 Da. The film-forming resin may have an Mn from 1,000 to 250,000 Da, such as from 1,000 to 150.00 Da, such as from 1,000 to 100,000 Da, such as from 1,000 to 50,000 Da, such as from 1,000 to 25,000 Da, such as from 1,000 to 20,000 Da, such as from 1,000 to 10,000 Da, or such as from 1,000 to 5,000 Da. The film-forming resin may have an Mn from 1,500 to 250,000 Da, such as from 1,500 to 150.00 Da, such as from 1,500 to 100,000 Da, such as from 1,500 to 50,000 Da, such as from 1,500 to 25,000 Da, such as from 1,500 to 20,000 Da, such as from 1,500 to 10,000 Da, or such as from 1,500 to 5,000 Da. The film-forming resin may have an Mn from 2,000 to 250,000 Da, such as from 2,000 to 150,000 Da, such as from 2,000 to 100,000 Da, such as from 2,000 to 50,000 Da, such as from 2,000 to 25,000 Da, such as from 2,000 to 20,000 Da, such as from 2,000 to 10,000 Da, or such as from 2,000 to 5,000 Da. The film-forming resin may have an Mn from 1,000 to 5,000 Da.

As reported herein, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography") UV detector; 254 nm, solvent: unstabilized THF, retention time marker: toluene, sample concentration: 2 mg/ml).

The film-forming resin may have any suitable weight average molecular weight (Mw). The film-forming resin may have an Mw from 500 to 250,000 Daltons (Da=g/mole), such as from 1,000 to 150,000 Da, such as from 1,500 to 100,000 Da, such as from 2,000 to 50,000 Da, such as from 2,500 to 25,000 Da, such as from 3,000 to 20,000 Da, or such as from 4,000 to 15,000 Da.

The film-forming resin may have an Mw from 500 to 250,000 Da, such as from 500 to 150,000 Da, such as from 500 to 100,000 Da, such as from 500 to 50,000 Da, such as from 500 to 25,000 Da, such as from 500 to 20,000 Da, or such as from 500 to 15,000 Da. The film-forming resin may have an Mw from 1,000 to 250,000 Da, such as from 1,000 to 150,000 Da, such as from 1,000 to 100,000 Da, such as from 1,000 to 50,000 Da, such as from 1,000 to 25,000 Da, such as from 1,000 to 20,000 Da, or such as from 1,000 to 15,000 Da. The film-forming resin may have an Mw from 1,500 to 250,000 Da, such as from 1,500 to 150,000 Da, such as from 1,500 to 100,000 Da, such as from 1,500 to 50,000 Da, such as from 1,500 to 25,000 Da, such as from 1,500 to 20,000 Da, or such as from 1,500 to 15,000 Da. The film-forming resin may have an Mw from 2,000 to 250,000 Da, such as from 2,000 to 150,000 Da, such as from 2,000 to 100,000 Da, such as from 2,000 to 50,000 Da, such as from 2,000 to 25,000 Da, such as from 2,000 to 20,000 Da, or such as from 2,000 to 15,000 Da. The film-forming resin may have an Mw from 2,500 to 250,000 Da, such as from 2,500 to 150,000 Da, such as from 2,500 to 100,000 Da, such as from 2,500 to 50,000 Da, such as from 2,500 to 25,000 Da, such as from 2,500 to 20,000 Da, or such as from 2,500 to 15,000 Da. The film-forming resin may have an Mw from 3,000 to 250,000 Da, such as from 3,000 to 150,000 Da, such as from 3,000 to 100,000 Da, such as from 3,000 to 50,000 Da, such as from 3,000 to 25,000 Da, such as from 3,000 to 20,000 Da, or such as from 3,000 to 15,000 Da. The film-forming resin may have an Mw from 4,000 to 250,000 Da, such as from 4,000 to 150,000 Da, such as from 4,000 to 100,000 Da, such as from 4,000 to 50,000 Da, such as from 4,000 to 25,000 Da, such as from 4,000 to 20,000 Da, or such as from 4,000 to 15,000 Da.

As reported herein, the Mw may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilized THF, retention time marker: toluene, sample concentration: 2 mg/ml).

The coating composition may comprise any suitable amount of the phenolic resin. The coating composition may comprise a suitable amount of phenolic resin to crosslink the coating composition. The phenolic resin may be present in an amount of at least 0.5 wt %, based on the weight of the film-forming resin and the phenolic resin. The coating composition may comprise at least 0.5 wt %, at least 1.0 wt %, at least 5.0 wt %, or at least 10 wt % of the phenolic resin based on the total solid weight of the coating composition. The coating composition may comprise up to 95 wt %, up to 90 wt %, up to 80 wt %, up to 70 wt %, up to 60 wt %, up to 50 wt %, up to 40 wt %, up to 30 wt %, or up to 25 wt % of the phenolic resin based on the weight of the film-forming resin and the phenolic resin.

The coating composition may comprise 0.5 to 95 wt %, such as 1.0 to 95 wt %, 1.5 to 90 wt %, 5 to 90 wt %, 10 to 90 wt %, or 15 to 90 wt % of the phenolic resin based on the weight of the film-forming resin and the phenolic resin. The coating composition may comprise from 0.5 to 80 wt %, such as from 10 to 80 wt %, such as from 15 to 80 wt % of the phenolic resin based on the weight of the film-forming resin and the phenolic resin. The coating composition may comprise from 0.5 to 70 wt %, such as from 10 to 70 wt %, such as from 15 to 70 wt % of the phenolic resin based on the weight of the film-forming resin and the phenolic resin. The coating composition may comprise from 0.5 to 60 wt %, such as from 10 to 60 wt %, such as from 15 to 60 wt % of the phenolic resin based on the weight of the film-forming resin and the phenolic resin. The coating composition may comprise from 0.5 to 50 wt %, such as from 10 to 50 wt %, such as from 15 to 50 wt % of the phenolic resin based on the weight of the film-forming resin and the phenolic resin. The coating composition may comprise from 0.5 to 40 wt %, such as from 10 to 40 wt %, such as from 15 to 40 wt % of the phenolic resin based on the weight of the film-forming resin and the phenolic resin. The coating composition may comprise from 0.5 to 30 wt %, such as from 10 to 30 wt %, such as from 15 to 30 wt % of the phenolic resin based on the weight of the film-forming resin and the phenolic resin. The coating composition may comprise from 0.5 to 20 wt %, such as from 10 to 20 wt %, such as from 15 to 20 wt % of the phenolic resin based on the weight of the film-forming resin and the phenolic resin. The coating comprise may comprise from 10% to 30% wt of the phenolic resin based on the weight of the film-forming resin and the phenolic resin.

When the coating composition is a packaging coating composition, such a food and/or beverage packing coating composition, the coating composition comprises from 1 to 60 wt % of the phenolic resin based on the weight of the film-forming resin and the phenolic resin. When the coating composition is a packaging coating composition, such a food and/or beverage packing coating composition, the coating composition comprises from 1 to 30 wt % of the phenolic resin based on the weight of the film-forming resin and the phenolic resin. When the coating composition is a packaging coating composition, such a food and/or beverage packing coating composition, the coating composition may comprise from 1 to 25 wt % of the phenolic resin based on the weight of the film-forming resin and the phenolic resin.

The film-forming resin may be any suitable film-forming resin. For example, the film forming resin may comprise a condensation polymer, an addition polymer, or any combination thereof. The film-forming resin may comprise a chain growth polymer and/or a step growth polymer. Suitable examples of film-forming resins include, but are not limited to the following: polyester resins; acrylic resins; polyolefin resins; polyvinyl chloride (PVC) resins; alkyd resins; polyurethane resins; polyurea resins; polyether resins, polysiloxane resins; epoxy resins; epoxy mimic resins; or combinations thereof. Examples include a polyimide resin, a polyamide resin, a polyamideimide resin, a polyester graft acrylic, and/or an epoxy mimic resin.

The film-forming resin may comprise an acrylic material. The acrylic material may comprise any suitable acrylic material. For example, the acrylic material may comprise a polyester graft acrylic resin.

The film-forming resin may comprise a solution polymerized acrylic material, an emulsion polymerized acrylic latex material or a combination thereof.

When the film-forming resin comprises a solution polymerized acrylic material, the solution polymerized acrylic material may be any suitable solution polymerized acrylic material. By "solution polymerized" and like terms as used herein is meant a polymer that is formed by a polymerization method whereby one or more monomers are substantially dissolved in a solvent and polymerized. Once said monomers have been polymerized, the resultant solution polymerized acrylic material is suitably substantially soluble in said solvent.

Suitable ethylenically unsaturated monomers will be well known to a person skilled in the art.

The ethylenically unsaturated monomer may comprise one or more acrylic monomer(s). Suitable acrylic monomers include, but are not limited to, alkyl (alk)acrylate, such as $C_1$ to $C_6$ alkyl ($C_1$ to $C_6$ alk)acrylate, for example, $C_1$ to $C_6$ alkyl (meth)acrylate, and (alk)acrylic acid, such as ($C_1$ to $C_6$ alk)acrylic acid. The acrylic monomers may comprise one or more functional group, such as an epoxy group. For example, the acrylic monomers may comprise glycidyl methacrylate.

The terms "(alk)acrylate", "(meth)acrylate" and like terms as used herein are used conventionally and herein to refer to both alkacrylate and acrylate, such as methacrylate and acrylate.

Examples of suitable acrylic monomers include, but are not limited to, acrylic acid, methacrylic acid, methyl acrylate; methyl methacrylate; ethyl acrylate; ethyl methacrylate; propyl acrylate; propyl methacrylate; isopropyl methacrylate, isobutyl methacrylate, butyl acrylate; butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, decyl acrylate decyl methacrylate, isodecyl acrylate, isodecyl methacrylate, lauryl acrylate, lauryl methacrylate, octyl acrylate, octyl methacrylate, nonyl acrylate, nonyl methacrylate isobornyl acrylate, isobornyl methacrylate, hydroxyethyl acrylate, hydroxyethyl methacrylate, hydroxypropyl methacrylate, hydroxypropyl acrylate, phenoxy ethyl acrylate 2-ethylhexyl acrylate, 2-ethylhexyl methacrylate, glycidyl methacrylate; ethylene glycol diacrylate; ethylene glycol dimethacrylate; 1,6-hexanediol diacrylate; 1,6-hexanediol dimethacrylate; 4-hydroxybutyl acrylate; 4-hydroxybutyl methacrylate; allyl methacrylate; benzyl methacrylate; phosphate esters of 2-hydroxyethyl methacrylate; those sold under the trade name SIPOMER such as SIPOMER PAM-100, SIPOMER PAM-200 and SIPOMER PAM-300 (phosphate esters of polypropylene glycol monoacrylate commercially available from Solvay); acrylamides such as, for example, acrylamide methacrylamide, N,N-dimethylacrylamide, N-ethylacrylamide, N-hydroxyethyl acrylamide, diacetone acrylamide, N,N-diethylacrylamide, N-isopropylacrylamide and N-isopropylmethacrylamide; 2-acrylamido methyl-1-propanesulfonic acid; and combinations thereof. Any other acrylic monomers known to those skilled in the art could also be used.

The ethylenically unsaturated monomer may comprise one or more vinyl ether monomer(s). Examples of suitable vinyl ether monomers include, but are not limited to, methyl vinyl ether, ethyl vinyl ether, n-propyl vinyl ether, isopropyl vinyl ether, n-butyl vinyl ether, isobutyl vinyl ether, t-butyl vinyl ether, pentyl vinyl ether, cyclopentyl vinyl ether, hexyl vinyl ether, cyclohexyl vinyl ether, 2-ethylhexyl vinyl ether, 2-hydroxyethyl vinyl ether, 4-hydroxybutyl vinyl ether, 2-(2-hydroxyethyl) ethyl vinyl ether, octyl vinyl ether, benzyl vinyl ether, phenyl vinyl ether, phenethyl vinyl ether, allyl vinyl ether and combinations thereof.

The ethylenically unsaturated monomer may comprise one or more additional ethylenically unsaturated monomer(s). Examples of suitable additional ethylenically unsaturated monomers include, but are not limited to, aryl substituted ethylenically unsaturated monomers such as, for example, styrene, α-methylstyrene, vinyltoluene, chloromethylstyrene, 4-hydroxy styrene, diglycidyloxymethyl styrene, 2,4-diglycidyloxymethylstyrene, 2,5-diglycidyloxymethylstyrene, 2,6-diglycidyloxymethylstyrene, 2,3,4-triglycidyloxymethyl styrene, 2,3,5-triglycidyl oxime styrene, 2,3,6-triglycidyloxymethylstyrene and 3,4,5-triglycidyloxymethylstyrene, 2,4,6-triglycidyloxymethylstyrene, ethylenically unsaturated nitriles such as, for example, acrylonitrile or methacrylonitrile, vinyl esters such as, for example, vinyl acetate and vinyl propionate, ethene, propene, 1-butene, 2-butene, 1-pentene, 2-pentene, 1,-hexene, 2-hexene, 3-hexene, 1-hetpene, 2-heptene, 3-heptene, 1-octene, 2-octene, 3-octene, 4-octene, isobutylene, vinyl chloride, butadiene, isoprene, chloroprene, N-vinyl monomers such as, for example, N-vinyl pyrrolidone, N-vinyl caprolactam and N-vinyl acetamide, unsaturated fatty acid ester; allyl glycidyl ether, allyl ethyl ether and combinations thereof. The additional ethylenically unsaturated monomer(s) may comprise monomers, oligomers and/or polymers of the aforementioned monomers. For example, butadiene may be in the form of a monomer or may be in the form of polybutadiene.

The ethylenically unsaturated monomer(s) may comprise styrene, one or more vinyl ether monomer(s), vinyl acetate or combinations thereof.

For the avoidance of doubt, an acrylic material or polymer in the context of the present invention is a material formed from at least one acrylic monomer (as defined herein). The acrylic material may comprise any suitable amount of acrylic monomer(s). For example, the acrylic material may comprise at least 10 wt %, such as at least 20 wt %, such as at least 30 wt %, such as at least 40 wt %, such as at least 50 wt %, such as at least 60 wt %, such as at least 70 wt %, such as at least 80 wt %, or even at least 90 wt % of acrylic monomer(s) based on the total solid weight of the monomers from which the acrylic material is formed. The acrylic material may comprise up to 100 wt % of acrylic monomer(s) based on the total solid weight of the monomers from which the acrylic material is formed.

The acrylic material may comprise from 10 to 100 wt % of acrylic monomer(s) based on the total solid weight of the monomers from which the acrylic material is formed.

For example, the acrylic material may comprise up to 90 wt % of one or more additional ethylenically unsaturated monomer(s) based on the total solid weight of the monomers from which the acrylic material is formed. The acrylic material may comprise up to 80 wt %, such as up to 70 wt %, such as up to 60 wt %, such as up to 50 wt %, such as up to 40 wt %, such as up to 30 wt %, such as up to 20 wt %, or even up to 10 wt % of one or more additional ethylenically unsaturated monomer(s) based on the total solid weight of the monomers from which the acrylic material is formed. The acrylic material may comprise no, i.e. 0 wt %, additional ethylenically unsaturated monomers based on the total solid weight of the monomers from which the acrylic material is formed.

The solution polymerized acrylic material may be substantially free, may be essentially free or may be completely free of styrene. By substantially free in relation to styrene, is meant that the solution polymerized acrylic material is formed from monomers which comprise less than 5 wt % of styrene based on the total weight of the monomers from which the solution polymerized acrylic material is formed. By essentially free in relation to styrene, is meant that the solution polymerized acrylic material is formed from monomers which comprise less than 1 wt % of styrene based on the total weight of the monomers from which the solution polymerized acrylic material is formed. By completely free in relation to styrene, is meant that the solution polymerized acrylic material is formed from monomers which comprise less than 0.01 wt % of styrene based on the total weight of the monomers from which the solution polymerized acrylic material is formed. The solution polymerized acrylic material may be formed from monomers which comprise no, i.e. 0 wt %, styrene based on the total weight of the monomers from which the solution polymerized acrylic material is formed.

The solution polymerized acrylic material is suitably formed by a solution polymerization method. Suitable solution polymerization methods will be well known to a person skilled in the art. The solution polymerization method suitably comprises a plurality of components, which may be referred to as a solution polymerization reaction mixture.

The solution polymerization reaction mixture suitably comprises a solution polymerization monomer component. The solution polymerization monomer component may comprise one or more acrylic monomer(s) as described herein. The solution polymerization monomer component may optionally comprise additional ethylenically unsaturated monomers as described herein.

The solution polymerization reaction mixture may further comprise an initiator. The initiator may be a free radical initiator. Suitable initiators include, but are not limited to, tertiary butyl perbenzoate; tert-butyl-peroxy 3,5,5-trimethylhexanoate; tertiary butyl peroxy 2-ethyl hexanoate; di tertiary butyl peroxide; tertiary butyl peracetate; tertiary butyl peroctoate; azo type initiators such as, for example, 2,2'-azobis(isobutyronitrile), 2,2'-azobis(2-methylbutyronitrile), 2,2'-azobis(2.4-dimethyl valeronitrile) and 2,2'-azobis (4-methoxy-2.4-dimethyl valeronitrile); persulphate initiators such as, for example, ammonium persulphate, sodium persulphate or potassium persulphate; and combinations thereof. The initiator may be soluble in the solution polymerization reaction mixture. The initiator may be soluble in the monomer mixture.

The solution polymerization reaction mixture suitably comprises a solvent or mixture of solvents. Suitable solvents will be well known to a person skilled in the art. Examples of suitable solvents include, but are not limited to, alcohols such as, for example, n-butanol, pentanol or hexanol; glycols such as, for example, butyl glycol; glycol ethers such as, for example, 2-butoxy ethanol, 1-methoxy propan-2-ol or dipropylene glycol mono methyl ether; hydrogen peroxide, tert-butyl hydro peroxide, benzoin, and combinations thereof. The solvent may comprise a mixture of solvents, such as n-butanol and butyl glycol. It will be appreciated by a person skilled in the art that the solvent or mixture of solvents is typically chosen such that the monomer mixture is substantially soluble in said solvent or mixture of solvents.

The solution polymerization monomer component is caused to undergo polymerization in the solvent or mixture of solvents to form the solution polymerized acrylic material. Thus, the solution polymerization of the solution polymerization monomer component is typically carried out as a free radical initiated solution polymerization in a solvent or mixture of solvents.

Solution polymerization may be carried out at any suitable temperature. Solution polymerization may be carried out at an elevated temperature. Solution polymerization may be carried out at a temperature from 80° C. to 200° C., suitably from 100 to 180° C., such as from 120 to 160° C., or such as from 130 to 150° C. Solution polymerization may be carried out at a temperature from 135 to 140° C. Solution polymerization may be carried out at reflux.

The solution polymerized acrylic material may comprise pendant acid groups. The acid groups of the solution polymerized acrylic material, if present, may be at least partially neutralized. The acid groups of the solution polymerized acrylic material, if present, may be at least partially neutralized by contacting said solution polymerized acrylic material with a neutralizer. Thus, the solution polymerized acrylic material may comprise a neutralizer. Suitable neutralizers will be well known to a person skilled in the art. Examples of suitable neutralizers include, but are not limited to tertiary amines such as, for example, dimethylethanolamine (DMEA), trimethyl amine, methyl diethanol amine, ethyl methyl ethanol amine, dimethyl ethyl amine, dimethyl propyl amine, dimethyl 3-hydroxy-1-propyl amine, dimeythylbenzyl amine, dimethyl 2-hydroxy-1-propyl amine, diethyl methyl amine, dimethyl 1-hydroxy-2-propyl amine, triethyl amine, tributyl amine, N-methyl morpholine; ammonia; hydrazine; metallic aluminium; metallic zinc; water-soluble oxides of the elements Li, Na, K, Mg, Ca, Fe(II) and Sn(II); water-soluble hydroxides of the elements Li, Na, K, Mg, Ca, Fe(II) and Sn(II); water-soluble carbonates of the elements Li, Na, K, Mg, Ca, Fe(II) and Sn(II); and combinations thereof. The neutralizer may comprise a tertiary amine. The neutralizer may comprise dimethylethanolamine (DMEA).

The solution polymerized acrylic material may be substantially dissolved and/or dispersed in water. The solution polymerized acrylic material may be substantially dissolved in water. The solution polymerized acrylic material may be substantially dissolved and/or dispersed in water before, during or after the addition of neutralizer. The solution polymerized acrylic material may be substantially dissolved and/or dispersed in water during the addition of neutralizer. Therefore, the solution polymerized acrylic material may be formed in one or more solvent and subsequently substantially dissolved and/or dispersed in water. The solution polymerized acrylic material may be formed in one or more solvent and subsequently substantially dissolved in water. The solution polymerized acrylic material has sufficient functionality such that it may be substantially dissolved in water.

When the film-forming resin comprises an emulsion polymerized acrylic latex material, the emulsion polymerized acrylic latex material may be any suitable emulsion polymerized acrylic latex material. By "emulsion polymerized" and like terms as used herein is meant a polymer that is formed by a polymerization method which starts with an emulsion comprising, at least, water and one or more monomer(s) that are substantially insoluble in the said water. Typically, the one or more monomer(s) form an oil phase in the aqueous phase (water). The resultant emulsion polymerized acrylic latex material is in the form of a stable emulsion of polymer microparticles in the aqueous medium.

The emulsion polymerized acrylic latex material may be formed from one or more acrylic monomer(s). Suitable acrylic monomers are as described herein in relation to the solution polymerized acrylic material.

The emulsion polymerized acrylic material suitably comprises pendant hydroxyl groups such that the solution polymerized acrylic material is hydroxyl-functional. The pendant hydroxyl groups may be provided in any suitable manner. The pendant hydroxyl groups may be provided by monomers having one or more pendant hydroxyl groups. Suitable examples of monomers having one or more pendant hydroxyl groups are as described herein in relation to the ethylenically unsaturated monomers.

The emulsion polymerized acrylic latex material may be formed from one or more additional ethylenically unsaturated monomer(s). Suitable additional ethylenically unsaturated monomer(s) are as described herein in relation to the solution polymerized acrylic material. The additional ethylenically unsaturated monomer(s) may comprise styrene.

The emulsion polymerized acrylic latex material may be formed from monomers comprising ethyl acrylate, styrene, (meth)acrylic acid, butyl (meth)acrylate, glycidyl methacrylate, acrylic acid, HEMA, or combinations thereof.

The emulsion polymerized acrylic latex material may be substantially free, may be essentially free or may be completely free of styrene. Substantially free, essentially free and completely free in relation to styrene is as described herein in relation to the solution polymerized acrylic material.

The emulsion polymerized acrylic latex material may comprise an aqueous dispersion of said emulsion polymerized acrylic latex material.

The emulsion polymerized acrylic latex material is suitably formed by an emulsion polymerization method. Suitable emulsion polymerization methods will be well known to a person skilled in the art. The emulsion polymerization method suitably comprises a plurality of components, which may be referred to as an emulsion polymerization reaction mixture.

The emulsion polymerization reaction mixture suitably comprises an emulsion polymerization monomer component. The emulsion polymerization monomer component may comprise one or more acrylic monomer(s) as described herein. The emulsion polymerization monomer component may optionally comprise additional ethylenically unsaturated monomers as described herein.

The emulsion polymerization reaction mixture may further comprise an initiator. Suitable initiators are as described herein in relation to the solution polymerized acrylic material. Suitably, the initiator may comprise ammonium persulphate, hydrogen peroxide, benzoin or combinations thereof.

The emulsion polymerization reaction mixture may comprise water.

The monomer component of the emulsion polymerization reaction mixture is suitably caused to undergo polymerization in the water to form the emulsion polymerized acrylic latex material. Thus, the polymerization of the monomer component of the emulsion polymerization reaction mixture is typically carried out as a free radical initiated emulsion polymerization in water. The monomer component of the emulsion polymerization reaction mixture suitably forms an oil phase in the water.

The emulsion polymerization reaction mixture may comprise a buffer. Suitable buffers will be well known to a person skilled in the art. The buffer may be operable to act as a hydrogen ion acceptor. Examples of suitable buffers include, but are not limited to sodium bicarbonate.

The emulsion polymerization reaction mixture may comprise a surfactant. The surfactant may be an anionic, cationic or non-ionic type stabilizer. Suitable examples of anionic surfactants include, but are not limited to, alkyl sulphates such as, for example, sodium dodecyl sulphate or sodium polyoxy ethylene alkyl ether sulphate; aryl sulphonates such as, for example, sodium dodecylbenzene sulphonate; sulphosuccinates such as, for example, sodium diisobutyl sulpho succinate, sodium dioctyl sulpho succinate and sodium di cyclohexyl sulpho succinate; and combinations thereof. Suitable examples of nonionic emulsifiers include, but are not limited to, fatty alcohol ethoxylates such as, for example polyethylene glycol mono lauryl ether; fatty acid ethoxylates such as, for example, polyethylene glycol mono stearate or polyethylene glycol mono laurate; polyether block polymers such as, for example, polyethylene glycol/polypropylene glycol block polymers also known as pluronics, typical commercial products of this type include Tergitol® XJ, XH or XD commercially available from Dow Chemical; and combinations thereof. Suitable examples of cationic emulsifiers include, but are not limited to, amine salts such as, for example, cetyl trimethyl ammonium chloride or benzyl dodecyl dimethyl ammonium bromide; and combinations thereof. It will be appreciated by a person skilled in the art that mixtures of anionic and cationic emulsifiers would typically not be desirable.

The surfactant may be polymeric. The surfactant may be polymerizable with the emulsion polymerized acrylic latex material. For example, the surfactant may be polymerizable with the monomers that form the emulsion polymerized acrylic latex material.

The emulsion polymerization reaction mixture may be substantially free, may be essentially free or may be completely free of surfactant. By substantially free in relation to surfactants, is meant that the emulsion polymerization reaction mixture comprises less than 5 wt % of surfactant based on the total weight of the emulsion polymerization reaction mixture. By essentially free in relation to surfactants, is meant that the emulsion polymerization reaction mixture comprises less than 1 wt % of surfactant based on the total weight of the emulsion polymerization reaction mixture. By completely free in relation to surfactants, is meant that the emulsion polymerization reaction mixture comprises less than 0.01 wt % of surfactant based on the total weight of the emulsion polymerization reaction mixture. Suitably, emulsion polymerization reaction mixture comprises no, i.e. 0 wt %, surfactant.

The emulsion polymerization reaction mixture may comprise a neutralizer. Suitable neutralizers are as described herein in relation to the solution polymerized acrylic material. A neutralizer may be added to at least of portion of the emulsion polymerization monomer component. A neutralizer may be added to at least a portion of the emulsion polymerization monomer component prior to the polymerization reaction, i.e. prior to the emulsion polymerization monomer component contacting the initiator.

Emulsion polymerization may be carried out at any suitable temperature. Emulsion polymerization may be carried out at a temperature from 20° C. to 150° C., suitably from 40 to 120° C., such as from 50 to 100° C., such as from 60 to 95° C., or such as from 70 to 90° C. The temperature is typically held constant throughout the emulsion polymerization process.

The emulsion polymerized acrylic latex material may comprise pendant acid groups. The acid groups of the emulsion polymerized acrylic latex material may be at least partially neutralized. The acid groups of the emulsion polymerized acrylic latex material may be at least partially neutralized by contacting said acid-functional emulsion polymerized acrylic latex material with a neutralizer. Thus, the emulsion polymerized acrylic latex material may comprise a neutralizer. Suitable neutralizers are as described herein in relation to the solution polymerized acrylic material. Suitably, the neutralizer may comprise a tertiary amine. The neutralizer may comprise dimethylethanolamine (DMEA).

The emulsion polymerized acrylic latex material may be in a core/shell arrangement.

The shell may be formed from a plurality of components, which may be referred to as a shell mixture. The shell mixture may comprise one or more acrylic monomer(s) as described herein. The shell mixture may optionally comprise additional ethylenically unsaturated monomers as described herein.

The core mixture may comprise ethyl acrylate, polyurethane (shell), polyester (core/shell), styrene, glycidyl methacrylate, urethane based shell with dmpa, or combinations thereof.

The shell mixture may further comprise one or more initiator(s). Suitable initiators are as described herein in relation to the solution polymerized acrylic material.

The shell mixture is typically caused to undergo polymerization to form a shell polymer. The polymerization of the shell mixture is typically carried out as a free radical initiated solution polymerization in a solvent or mixture of solvents. The solvents which may be used in this process include, but are not limited to, alcohols such as n-butanol, pentanol or hexanol; or glycol ethers such as 2-butoxy ethanol, 1-methoxy propan-2-ol or dipropylene glycol mono methyl ether. Polymerization may be carried out at an elevated temperature. The polymerization may be carried out in the range 80° C. to 150° C. The polymerization can be effectively carried out by adding the shell mixture, over a set time period, to the solvent mixture. The shell mixture may be caused to undergo polymerization to form a shell polymer prior to contact with components of the core mixture.

Where the shell mixture comprises one or more $\alpha,\beta$-ethylenically unsaturated carboxylic acid, the shell polymer will have pendant carboxylic acid functional groups. This may be referred to a carboxylic acid functional shell polymer.

The carboxylic acid functional shell polymer may be contacted with a base to form a water dispersible salt. The carboxylic acid functionality in the carboxylic acid functional shell polymer may be at least partly neutralized with the base. Typically at least 10% of the available carboxylic acid groups are neutralized. Substantially all of the available carboxylic acid groups may be neutralized by the base. The base used for this neutralization may comprises an amine functional material, or a mixture of amine functional materials. Examples of suitable amine functional materials include ammonia, triethylamine, diethylamine, trimethylamine and morphline or hydroxy amine materials such as ethanol amine, N-methyl ethanol amine and N,N di methyl ethanolamine.

The shell polymer may be dispersed in aqueous medium. In this manner, an aqueous dispersion or solution of the shell polymer may be formed.

The shell mixture may be caused to undergo polymerization to form a shell polymer by emulsion polymerization in an aqueous medium, thereby forming an aqueous dispersion or solution of the shell polymer.

The core may be formed from plurality of components, which may be referred to as a core mixture. The core mixture comprises one or more acrylic monomer(s) as described herein. The core mixture may optionally comprise additional ethylenically unsaturated monomers as described herein.

The core mixture may comprise ethyl acrylate, polyester, styrene, glycidyl (meth)acrylate, butyl (meth)acrylate, (meth)acrylate, or combinations thereof.

The polymer formed from the shell mixture, such as an aqueous dispersion thereof, may serve as a dispersant for a subsequent polymerization, which may be a polymerization of an α,β-ethylenically unsaturated monomer mixture, such as the core mixture.

The core mixture may further comprise one or more one or more initiator(s). Suitable initiators are as described herein in relation to the solution polymerized acrylic material.

The core mixture may be caused to undergo polymerization at a temperature in the range from 30° C. to 99° C., suitably in the range from 50° C. to 95° C., such as in the range from 80° C. to 90° C. Polymerization of the core mixture may occur in the presence of the polymer formed by polymerization of the shell mixture to thereby form a core/shell polymer, such as by emulsion polymerization. A typical polymerization may be carried out by adding the core mixture, at a controlled rate over a period of time, to an aqueous dispersion of shell polymer. During the polymerization the mixture may be mixed, such as by stirring and the temperature may be held generally constant.

Other methods to polymerize the core mixture include, but are not limited to, mixing all or part of the core ethylenically unsaturated substances with the aqueous dispersion of shell polymer and then adding the remaining core components, including initiator, to the resulting mixture over a set period of time. Suitable temperatures for this type of process are typically in the range 50° C. to 95° C.

For the core/shell latex composition the ratio of the core mixture (monomers and initiator) to shell mixture (monomers and initiator) may be from 20:80 to 90:10 by weight. The ratio of the core mixture to shell mixture may be from 60:40 to 80:20 by weight, such as from 70:30 to 75:25 by weight.

The film-forming resin may comprise an emulsion polymerized latex acrylic material.

The coating composition may comprise any suitable amount of emulsion polymerized latex acrylic material, when present. The coating composition may comprise at least 10 wt %, such as at least 20 wt %, such as at least 30 wt %, such as at least 40 wt %, or even at least 50 wt % of the latex acrylic material based on the total solid weight of the coating composition. The coating composition may comprise up to 99 wt %, such as up to 95 wt %, such as up to 90 wt %, such as up to 80 wt % or even up to 75 wt % of the latex acrylic material based on the total solid weight of the coating composition.

The coating composition may comprise from 10 to 99 wt %, such as from 20 to 99 wt %, such as from 30 to 99 wt %, such as from 40 to 99 wt % or such as from 50 to 99 wt % of the latex acrylic material based on the total solid weight of the coating composition. The coating composition may comprise from 10 to 95 wt %, such as from 20 to 95 wt %, such as from 30 to 95 wt %, such as from 40 to 95 wt % or such as from 50 to 95 wt % of the latex acrylic material based on the total solid weight of the coating composition. The coating composition may comprise from 10 to 90 wt %, such as from 20 to 90 wt %, such as from 30 to 90 wt %, such as from 40 to 90 wt % or such as from 50 to 90 wt % of the latex acrylic material based on the total solid weight of the coating composition. The coating composition may comprise from 10 to 80 wt %, such as from 20 to 80 wt %, such as from 30 to 80 wt %, such as from 40 to 80 wt % or such as from 50 to 80 wt % of the latex acrylic material based on the total solid weight of the coating composition. The coating composition may comprise from 10 to 75 wt %, such as from 20 to 75 wt %, such as from 30 to 75 wt %, such as from 40 to 75 wt % or such as from 50 to 75 wt % of the latex acrylic material based on the total solid weight of the coating composition.

The coating composition may comprise from 50 to 75 wt % of the latex acrylic material based on the total solid weight of the coating composition.

The coating composition may comprise any suitable amount of the phenolic resin. The coating composition may comprise at least 1 wt %, such as at least 5 wt %, such as at least 10 wt %, such as at least 12.5 wt %, such as at least 15 wt %, such as at least 17.5 wt %, such as at least 20 wt %, such as at least 22.5 wt % or even at least 25 wt % of the phenolic resin based on the total solid weight of the coating composition. The coating composition may comprise up to 90 wt %, such as up to 80 wt %, such as up to 70 wt %, such as up to 60 wt %, such as up to 50 wt % or even up to 45 wt % of the phenolic resin based on the total solid weight of the coating composition.

The coating composition may comprise from 1 to 90 wt %, such as from 5 to 90 wt %, such as from 10 to 90 wt %, such as from 12.5 to 90 wt %, such as from 15 to 90 wt %, such as from 17.5 to 90 wt %, such as from 20 to 90 wt %, such as from 22.5 to 90 wt % or such as from 25 to 90 wt % of the phenolic resin based on the total solid weight of the coating composition. The coating composition may comprise from 1 to 80 wt %, such as from 5 to 80 wt %, such as from 10 to 80 wt %, such as from 12.5 to 80 wt %, such as from 15 to 80 wt %, such as from 17.5 to 80 wt %, such as from 20 to 80 wt %, such as from 22.5 to 80 wt % or such as from 25 to 80 wt % of the phenolic resin based on the total solid weight of the coating composition. The coating composition may comprise from 1 to 70 wt %, such as from 5 to 70 wt %, such as from 10 to 70 wt %, such as from 12.5 to 70 wt %, such as from 15 to 70 wt %, such as from 17.5 to 70 wt %, such as from 20 to 70 wt %, such as from 22.5 to 70 wt % or such as from 25 to 70 wt % of the phenolic resin based on the total solid weight of the coating composition. The coating composition may comprise from 1 to 60 wt %, such as from 5 to 60 wt %, such as from 10 to 60 wt %, such as from 12.5 to 60 wt %, such as from 15 to 60 wt %, such as from 17.5 to 60 wt %, such as from 20 to 60 wt %, such as from 22.5 to 60 wt % or such as from 25 to 60 wt % of the phenolic resin based on the total solid weight of the coating composition. The coating composition may comprise from 1 to 50 wt %, such as from 5 to 50 wt %, such as from 10 to 50 wt %, such as from 12.5 to 50 wt %, such as from 15 to 50 wt %, such as from 17.5 to 50 wt %, such as from 20 to 50 wt %, such as from 22.5 to 50 wt % or such as from 25 to 50 wt % of the phenolic resin based on the total solid weight of the coating composition. The coating composition may comprise from 1 to 45 wt %, such as from 5 to 45 wt %, such as from 10 to 45 wt %, such as from 12.5 to 45 wt %, such as from 15 to 45 wt %, such as from 17.5 to 45 wt %, such as from 20 to 45 wt %, such as from 22.5 to 45 wt % or such as from 25 to 45 wt % of the phenolic resin based on the total solid weight of the coating composition.

The coating composition may optionally comprise a further crosslinking material. The further crosslinking agent may be any suitable crosslinking material. Suitable further crosslinking agents will be known to a person skilled in the art. Examples of suitable further crosslinking materials include, but are not limited to, phenolic resins (or phenol-formaldehyde resins); aminoplast resins (or triazine-form-aldehyde resins); amino resins, such as benzoguanamine resins and/or benzoguanamine-formaldehyde resins; epoxy resins; epoxy-mimic resins, such as those based on bisphe-nols and other bisphenol A (BPA) replacements; isocyanate resins; isocyanurate resins, such as triglycidylisocyanurate; hydroxy (alkyl) amide resins, such as β-hydroxy (alkyl) amide resins; hydroxy(alkyl) urea resins; carbodiimide res-ins; oxazolines; alkylated carbamate resins; polyacids; anhy-drides; organometallic acid-functional materials; polyamines; and/or polyamides and combinations thereof.

Suitable examples of additional phenolic resins are those formed from the reaction of a phenol with an aldehyde or a ketone, such as from the reaction of a phenol with an aldehyde, such as from the reaction of a phenol with formaldehyde or acetaldehyde, or such as from the reaction of a phenol with formaldehyde. Non-limiting examples of phenols which may be used to form the additional phenolic resins are phenol, butyl phenol, xylenol and cresol. General preparation of phenolic resins is described in "The Chem-istry and Application of Phenolic Resins or Phenoplasts", Vol V, Part I, edited by Dr Oldring; John Wiley and Sons/ Cita Technology Limited, London, 1997. Suitable examples of commercially available phenolic resins include, but are not limited to those sold under the trade name PHENO-DUR® commercially available from Allnex, such as PHE-NODUR EK-827, PHENODUR VPR1785, PHENODUR PR 515, PHENODUR PR516, PHENODUR PR 517, PHE-NODUR PR 285, PHENODUR PR612 or PHENODUR PH2024; resins sold under the trade name BAKELITE® commercially available from Sumitomo Bakelite co., ltd., such as BAKELITE 6582 LB, BAKELITE 6535, BAKE-LITE PF9989 or BAKELITE PF6581; SFC 112 commer-cially available from SI Group; DUREZ® 33356 commer-cially available from SHHPP; ARALINK® 40-852 commercially available from Bitrez; or combinations thereof.

Suitable examples of isocyanate resins include, but are not limited to the following: isophorone diisocyanate (IPDI), such as those sold under the trade name DESMODUR® commercially available from Covestro, for example DES-MODUR VP-LS 2078/2 or DESMODUR PL 340 or those sold under the trade name VESTANAT® commercially available from Evonik, for example VESTANANT B 1370, VESTANAT B 118 6A or VESTANAT B 1358 A; blocked aliphatic polyisocyanate based on hexamethylene diisocya-nate (HDI), such as those sold under the trade name DES-MODUR® commercially available from Covestro, for example DESMODUR BL3370 or DESMODUR BL 3175 SN, those sold under the trade name DURANATE® com-mercially available from Asahi KASEI, for example DURANATE MF-K60X, those sold under the trade name TOLONATE® commercially available from Vencorex Chemicals, for example TOLONAIE D2 or those sold under the trade name TRIXENE® commercially available from Baxenden, for example TRIXENE-BI-7984 or TRIXENE 7981; or combinations thereof.

The further crosslinking material may be substantially free, may be essentially free or may be completely free of formaldehyde. In the context of the further crosslinking material, "substantially free" refers to a further crosslinking material containing less than 5 wt % formaldehyde based on the total solid weight of the crosslinking material, "essentially free" refers a further crosslinking material containing less than 1 wt % formaldehyde based on the total solid weight of the crosslinking material and "completely free" refers to a further crosslinking material containing 0 wt % (i.e. no) formaldehyde based on the total solid weight of the crosslinking material.

The further crosslinking material may be completely free of formaldehyde.

The coating composition may further comprise a solvent. The coating composition may comprise a single solvent or a mixture of solvents. The solvent may comprise water, an organic solvent, a mixture of water and an organic solvent or a mixture of organic solvents. The coating composition may comprise an organic solvent or a mixture of organic solvents.

The organic solvent suitably has sufficient volatility to essentially entirely evaporate from the coating composition during the curing process. As a non-limiting example, the curing process may be by heating at 130-230° C. for 1-15 minutes.

Suitable organic solvents include, but are not limited to the following: aliphatic hydrocarbons such as mineral spirits and high flash point naphtha; aromatic hydrocarbons such as benzene; toluene; xylene; solvent naphtha 100, 150, 200; those available from Exxon-Mobil Chemical Company under the SOLVESSO® trade name; alcohols such as etha-nol; n-propanol; isopropanol; n-butanol; pentanol; amyl alcohol; 1-methoxy-2-propanol; and butoxy ethanol; ketones such as acetone; cyclohexanone; methylisobutyl ketone; methyl ethyl ketone; esters such as ethyl acetate; butyl acetate; n-hexyl acetate; RHODIASOLV® RPDE (a blend of succinic and adipic esters commercially available from Rhodia); glycols such as butyl glycol; glycol ethers such as methoxypropanol; ethylene glycol monomethyl ether; ethylene glycol monobutyl ether; those available from Dow under the DOWANOL® trade name, such as DOWA-NOL PM, DOWANOL DPM and DOWANOL PPH, for example; and combinations thereof.

The coating composition may comprise any suitable amount of solvent. The coating composition may comprise from 1 to 50 wt %, such as from 2 to 40 wt %, such as from 5 to 30 wt %, such as from 5 to 20 wt %, such as from 5 to 15 wt %, or even 10 wt % solvent based on the total weight of the coating composition.

The phenolic resin and/or film-forming resin may be dissolved or dispersed in the said solvent during and/or after its formation.

The coating composition may further comprise a catalyst. As stated above, the coating composition may be substan-tially free, essentially free, or completely free of catalyst. Suitable catalysts will be well known to the person skilled in the art. The catalyst may be a non-metal, a metal catalyst or a combination thereof. Suitable non-metal catalysts include, but are not limited to the following: phosphoric acid; blocked phosphoric acid; phosphatised resins such as, for example, phosphatised epoxy resins and phosphatised acrylic resins; CYCAT® XK 406 N (commercially available from Allnex); sulfuric acid; sulfonic acid; CYCAT 600 (commercially available from Allnex); NACURE® 5076 or NACURE 5925 (commercially available from King indus-tries); tertiary amines, ammonium salts, phosphonium salts, acid phosphate catalyst such as NACURE XC 235 (com-mercially available from King Industries); tertiary amines; ammonium salts; phosphonium salts; and combinations thereof. Suitable metal catalysts will be well known to the person skilled in the art. Suitable metal catalysts include, but are not limited to the following: tin containing catalysts, such as monobutyl tin tris (2-ethylhexanoate); zirconium containing catalysts, such as KKAT® 4205 (commercially available from King Industries); titanate based catalysts, such as tetrabutyl titanate TnBT (commercially available from Sigma Aldrich); and combinations thereof.

The catalyst, when present, may be used in the coating composition in any suitable amount. The coating composition may comprise from 0.001 to 10 wt %, such as from 0.001 to 5 wt %, such as from 0.01 to 5 wt %, such as from 0.05 to 3 wt %, such as from 0.1 to 2 wt %, such as from 0.1 to 1 wt %, or such as from 0.1 to 0.5 wt % of the catalyst, when present, based on the total solid weight of the coating composition.

The coating composition may be substantially free of a curing catalyst. "Substantially free" refers to the coating composition, or components thereof, containing less than 1000 parts per million (ppm) of curing catalyst. "Essentially free" refers to the coating composition, or components thereof, containing less than 100 ppm of any of curing catalyst. "Completely free" refers to the coating composition, or components thereof, containing less than 20 parts per billion (ppb) of curing catalyst. No curing catalyst may be need to be added in the coating composition to effect curing of the coating composition.

The coating composition may comprise other optional materials well known in the art of formulating coatings, such as colorants, plasticizers, abrasion-resistant particles, antioxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. Suitable colorants are listed in U.S. Pat. No. 8,614,286, column 7, line 2 through column 8, line 65, which is incorporated by reference herein. Particularly suitable for packaging coatings are those approved for food contact, such as titanium dioxide; iron oxides, such as black iron oxide; aluminium paste; aluminium powder such as aluminium flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

The colorant, when present, may be used in the coating composition in any suitable amount. The coating composition may comprise up to 90 wt %, such as up to 50 wt %, or even up to 10 wt % colorant, when present, based on the total solid weight of the coating composition.

Suitable lubricants will be well known to the person skilled in the art. Suitable examples of lubricants include, but are not limited to the following: carnauba wax and polyethylene type lubricants. The coating composition may comprise at least 0.01 wt % lubricant, when present, based on the total solid weight of the coating composition.

Surfactants may optionally be added to the coating composition in order to aid in flow and wetting of the substrate. Suitable surfactants will be well known to the person skilled in the art. Suitably the surfactant, when present, is chosen to be compatible with food and/or beverage container applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The coating composition may comprise from 0.01 wt % to 10 wt %, such as from 0.01 to 5 wt %, or such as from 0.01 to 2 wt % surfactant, when present, based on the total solid weight of the coating composition.

The coating compositions of the present invention may be substantially free, may be essentially free or may be completely free of bisphenol A (BPA) and derivatives thereof. Derivatives of bisphenol A include, for example, bisphenol A diglycidyl ether (BADGE). The coating compositions of the present invention may also be substantially free, may be essentially free or may be completely free of bisphenol F (BPF) and derivatives thereof. Derivatives of bisphenol F include, for example, bisphenol F diglycidyl ether (BPFG). The compounds or derivatives thereof mentioned above may not be added to the composition intentionally but may be present in trace amounts because of unavoidable contamination from the environment. "Substantially free" refers to coating compositions, or components thereof, containing less than 1000 parts per million (ppm) of any of the compounds or derivatives thereof mentioned above. "Essentially free" refers to coating compositions, or components thereof, containing less than 100 ppm of any of the compounds or derivatives thereof mentioned above. By "completely free" refers to coating compositions, or components thereof, containing less than 20 parts per billion (ppb) of any of the compounds or derivatives thereof mentioned above.

The coating compositions of the present invention may be substantially free, may be essentially free or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating composition may be substantially free, may be essentially free or may be completely free of glyoxal. "Substantially free" refers to coating compositions, or components thereof, containing less than 1000 parts per million (ppm) of glyoxal. "Essentially free" refers to coating compositions, or components thereof, containing less than 100 ppm of any of glyoxal. "Completely free" refers to coating compositions, or components thereof, containing less than 20 parts per billion (ppb) of glyoxal.

The coating compositions may be substantially free, may be essentially free or may be completely free of formaldehyde. "Substantially free" refers to coating compositions, or components thereof, containing less than 1000 parts per million (ppm) of formaldehyde. "Essentially free" refers to coating compositions, or components thereof, containing less than 100 ppm of any of formaldehyde. "Completely free" refers to coating compositions, or components thereof, containing less than 20 parts per billion (ppb) of formaldehyde.

Coated Substrate

Also encompassed in this disclosure is a coated substrate having a surface at least partially coated with the coating composition described above. The substrate may comprise a non-porous substrate, such as metal, glass, and/or plastic.

The substrate may be an article such as an automotive product, a household or office appliance, furniture item or tool, a powered industrial product, a consumer electronics article, an architectural product, a metal can, food and/or beverage packaging, or a product protected by an intumescent coating.

When the substrate is glass, the glass can include any type of glass such as soda-lime-silicate glass, borosilicate glass, or leaded glass. The glass can be clear glass such as non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. Further, as used herein, the term "float glass" refers to glass formed by a conventional float process in which molten glass is deposited onto a molten metal bath and controllably cooled to form a float glass ribbon. The glass may be annealed, heat-treated, thermally tempered, or chemically tempered glass. Suitable glass substrates include soda-lime-silica glass, such as soda-lime-silica slide glass sold from Fisher, or aluminosilicate glass such as Gorilla® glass from Corning Incorporated, or Dragontrail® glass from Asahi Glass Co., Ltd.

The substrate may be plastic, such as plastic components of motor vehicles. Such plastic substrates may include thermoplastic polyolefins, polypropylene, or other polymers. The substrate may include acrylonitrile butadiene styrenes, cellulose acetate butyrates, carbon nitrides, ethylene propylenes, melamine formaldehydes, polyamides, polyamides, polycarbonates, polyethyelenes, polybutylene terephthalate s, polyethylene terephthalates, polythiophenes, poly(methyl methacrylates), polyoxymethylenes, polypropylenes, poly(phenylene oxides), photoluminescence polymers, polyvinyl chlorides, styrene acrylonitriles, nylons, benzimidazobenzophenanthrolines, polyesters, reinforced polyesters, polyurethanes, reaction injected molding urethane, thermoplastic polyurethanes, and/or other polymers. The substrate may be a component of a vehicle, such as an automobile.

Suitable examples of plastic substrates may also include polymers prepared from polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polymers prepared from polyol(meth)acryloyl terminated carbonate monomer, diethylene glycol dimethacrylate monomers, ethoxylated phenol methacrylate monomers, diisopropenyl benzene monomers, ethoxylated trimethylol propane triacrylate monomers, ethylene glycol bismethacrylate monomers, poly(ethylene glycol) bismethacrylate monomers, or urethane acrylate monomers; poly (ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products.

The substrate may comprise a metal substrate. The metal substrate may be formed into a food and/or beverage container. The food and/or beverage container comprising a metal substrate may have a surface at least partially coated with the coating composition described above.

The metal substrate may be formed into a food or beverage container or portion thereof prior to or after the metal substrate is coated with the coating composition.

Suitable examples of metal substrates include, but are not limited to, the following: steel; tinplate; tinplate pre-treated with a protective material such as chromium, titanium, titanate or aluminum; tin-free steel (TFS); galvanized steel, such as for example electro-galvanized steel; aluminum; aluminum alloy; and combinations thereof.

Examples of suitable metal substrates include, but are not limited to, food and/or beverage packaging, components used to fabricate such packaging or monobloc aerosol cans and/or tubes.

The food and/or beverage packaging may be a can. Examples of cans include, but are not limited to, two-piece cans, three-piece cans and the like. Suitable examples of monobloc aerosol cans and/or tubes include, but are not limited to, deodorant and hair spray containers. Monobloc aerosol cans and/or tubes may be aluminium monobloc aerosol cans and/or tubes.

The substrate may be a food and/or beverage packaging or component used to fabricate such packaging.

The substrate may be a monobloc aerosol can and/or tube.

The application of various pre-treatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans.

The coating compositions are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

The substrate may be a package coated at least in part with any of the coating compositions described herein. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food and/or beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating compositions can be applied to the interior and/or the exterior of the package. The coating compositions could also be applied as a rim coat to the bottom of the can. The rim coat functions to reduce friction for improved handling during the continued fabrication and/or processing of the can. The coating compositions can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

The coating compositions may be applied to at least a portion of the substrate. For example, when the coating compositions are applied to a food and/or beverage can, the coating compositions may be applied to at least a portion of an internal and/or external surface of said food and/or beverage can. For example, when the coating compositions are applied to a food and/or beverage can, the coating compositions may be applied to at least a portion of an internal surface of said food and/or beverage can.

The coating composition may be applied as a repair coating for component parts of food and beverage cans. For example, as a repair coating for a full aperture easy open end for food cans. This end component may repair coated, after fabrication, by airless spraying of the material on to the exterior of the score line. Other uses as repair coatings include the coating of seams and welds, such as side seams for which the coating may be applied to the area by spraying (airless or air driven) or roller coating. Repair coating can also include protection of vulnerable areas where corrosion may be likely due to damage, these areas include flanges, rims and bottom rims where the coating may be applied by spraying, roller coating flow or dip coating.

An automotive product may be a vehicle or any part thereof. Any part or any surface of the vehicle which may undergo coating to improve a property thereof (for example its luster, scratch resistance, corrosion resistance or UV resistance) may be a coating with a composition as defined herein.

The term "vehicle" is used in its broadest sense and includes (without limitation) all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. Vehicles can include ground vehicles such as, for example, trailers, cars, trucks, buses, coaches, vans, ambulances, fire engines, motorhomes, caravans, go-karts, buggies, fork-lift trucks, sit-on lawnmowers, agricultural vehicles such as, for example, tractors and harvesters, construction vehicles such as, for example, diggers, bulldozers and cranes, golf carts, motorcycles, bicycles, trains, and railroad cars. Vehicles can also include watercraft such as, for example, ships, submarines, boats, jet-skis and hovercraft.

Parts of vehicles coated may include vehicular body parts (e.g., without limitation, doors, body panels, trunk deck lids, roof panels, hoods, roofs and/or stringers, rivets, wheels, landing gear components, and/or skins used on an aircraft), hulls, marine superstructures, vehicular frames, chassis, and vehicular parts not normally visible in use, such as engine parts, motorcycle fairings and fuel tanks, fuel tank surfaces and other vehicular surfaces exposed to or potentially exposed to fuels, aerospace solvents and aerospace hydraulic fluids. Any vehicular parts which may benefit from coating as defined herein may undergo coating, whether exposed to or hidden from view in normal use.

Household and office appliances, furniture items and tools as defined herein are appliances, furniture items and tools used in the home, including the garden, or in office environments. They may include fabric washers, dishwashers, dryers, refrigerators, stoves, microwave ovens, computer equipment and printers, air conditioning units, heat pump units, lawn and garden equipment including lawn furniture, hot tubs, lawnmowers, garden tools, hedge trimmers, string trimmers (strimmers), chainsaws, garden waster shedders, garden hand tools such as, for example, spades, forks, rakes and cutting tools, cupboards, desks, table, chairs, cabinets and other articles. Any parts of any such articles which may benefit from coating as defined herein may undergo coating; for example panels of appliances or furniture and handles of tools.

A powered industrial product may include, for example, pumps, electricity generators, air compressors, industrial heat pumps and air conditioners, batteries and cement mixers. Any parts which benefit from coating as defined herein may undergo coating; for example panels and casings.

A consumer electronics article may be, for example, a computer, computer casing, television, cellphone, pager, camera, calculator, printer, scanner, digital decoder, clock, audio player, headphones or tablet.

An architectural product may be, for example, a door, window, door frame, window frame, beam or support, or a panel, walling item or roofing item used in building construction, or a solar panel, a wind turbine, an oil/gas well, an off-shore rig, a storage tank, or in transportation infrastructure or utilities infrastructure.

Products protected by intumescent coatings are typically metallic structures, for example steel structures, which are coating with an intumescent coating. The metallic structures are typically load bearing parts of buildings. Unprotected steel will typically begin to soften at around 425° C. and lose approximately half of its strength by 650° C. Intumescent coatings are employed to retard the temperature increase of the steel, or other substrate. An intumescent coating may be improved by incorporation of the defined acrylic polyester resin into the matrix of the intumescent material prior to its coating onto a metallic substrate to be protected. The acrylic polyester resin may be present in an amount of at least 1 wt %, such as at least 2 wt %, for example at least 4 wt %, or at least 5%. The acrylic polyester resin may be present in an amount of up to 50 wt % by weight, such as up to 30 wt %, for example up to 25 wt %. These definitions refer to the weight of the acrylic polyester resin by weight of the admixed acrylic polyester resin/intumescent matrix material to be applied to a substrate.

Articles coated may fall in two or more of the categories set out above. For example computer equipment may be regarded as a household or as an office item, and as a consumer electronics item. A beam or support—an architectural item—may be coated with an intumescent material.

In the uses defined above a coating composition is typically to coat surfaces and parts thereof (except for the use in an intumescent coating which is an admixture). A part may include multiple surfaces. A part may include a portion of a larger part, assembly, or apparatus. A portion of a part may be coated with an aqueous composition or powder composition as defined herein or the entire part may be coated.

The substrate may be new (i.e., newly constructed or fabricated) or it may be refurbished, such as, for example, in the case of refinishing or repairing a component of an automobile or aircraft.

As mentioned above, the substrate may comprise a vehicle. For example, an aqueous or powder composition may be utilized in coating a F/A-18 jet or related aircraft such as the F/A-18E Super Hornet and F/A-18F (produced by McDonnell Douglas/Boeing and Northrop); in coating the Boeing 787 Dreamliner, 737, 747, 717 passenger jet aircraft, and related aircraft (produced by Boeing Commercial Airplanes); in coating the V-22 Osprey; VH-92, S-92, and related aircraft (produced by NAVAIR and Sikorsky); in coating the G650, G600, G550, G500, G450, and related aircraft (produced by Gulfstream); and in coating the A350, A320, A330, and related aircraft (produced by Airbus). An aqueous or powder composition may be used as a coating for use in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Methods

The present disclosure is also directed to a method of coating a substrate, the method comprising:

applying the coating composition described herein to at least a portion of a substrate; and thermally curing the coating composition.

The present disclosure is also directed to a method of coating a food and/or beverage container, the method comprising:

applying the coating composition described herein to at least a portion of a metal substrate prior to or after forming the metal substrate into a food or beverage container or portion thereof; and thermally curing the coating composition.

The coating compositions may be applied to the substrate by any suitable method. Suitable methods of applying the coating compositions will be well known to a person skilled in the art. Suitable application methods for the coating compositions include, but are not limited to the following: electrocoating, such as electrodeposition; spraying; electrostatic spraying; dipping; rolling; brushing; and the like.

The coating compositions may be applied to the substrate, or a portion thereof, as a single layer or as part of a multi layer system. The coating compositions may be applied as a single layer. The coating compositions may be applied to an uncoated substrate. For the avoidance of doubt an uncoated substrate extends to a surface that is cleaned prior to application. The coating compositions may be applied on top of another paint layer as part of a multi layer system. For example, the coating compositions may be applied on top of a primer. The coating compositions may form an intermediate layer or a top coat layer. The coating compositions may be applied as the first coat of a multi coat system. The coating compositions may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof.

The second, third, fourth etc. coats may comprise polyester resins. The second, third, fourth etc. coats may be a liquid coating or a powder coating.

It will be appreciated by a person skilled in the art that the coating compositions may be applied before or after forming the article, such as the packaging. For example, the coating compositions may be applied to metal substrate which is then shaped and formed into a metal article, or the coating composition may be applied to the preformed article.

The coating compositions may be applied to a substrate once or multiple times.

The coating compositions may be applied to the substrate by any suitable method. Methods of applying the coating compositions will be well known to a person skilled in the art. Suitable application methods for the coating compositions include, but are not limited to the following: electrocoating; spraying; electrostatic spraying; dipping; rolling; brushing; and the like.

Further information about suitable application methods of applying suitable coating compositions to substrates will now be given.

A liquid coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. The metal or metal alloy may comprise, for example, cold rolled steel, hot rolled steel, steel coated with zinc metal, zinc compounds, or zinc alloys, such as electrogalvanized steel, hot-dipped galvanized steel, galvanealed steel, nickel-plated steel, and steel plated with zinc alloy. The substrate may comprise an aluminum alloy. Non-limiting examples of aluminum alloys include the 1XXX, 2XXX, 3XXX, 4XXX, 5XXX, 6XXX, or 7XXX series as well as clad aluminum alloys and cast aluminum alloys, such as, for example, the A356 series. The substrate may comprise a magnesium alloy. Non-limiting examples of magnesium alloys of the AZ31B, AZ91C, AM60B, or EV31A series also may be used as the substrate. The substrate may also comprise other suitable non-ferrous metals such as titanium or copper, as well as alloys of these materials.

The part to be coated may be in the shape of a cylinder, such as a pipe, including, for example, a cast iron or steel pipe. The metal substrate also may be in the form of, for example, a sheet of metal or a fabricated part. The substrate may also comprise conductive or non-conductive substrates at least partially coated with a conductive coating. The conductive coating may comprise a conductive agent such as, for example, graphene, conductive carbon black, conductive polymers, or conductive additives. It will also be understood that the substrate may be pretreated with a pretreatment solution. Non-limiting examples of a pretreatment solution include a zinc phosphate pretreatment solution such as, for example, those described in U.S. Pat. Nos. 4,793,867 and 5,588,989, a zirconium containing pretreatment solution such as, for example, those described in U.S. Pat. Nos. 7,749,368 and 8,673,091. Other non-limiting examples of a pretreatment solution include those comprising trivalent chromium, hexavalent chromium, lithium salts, permanganate, rare earth metals, such as yttrium, or lanthanides, such as cerium. Another non-limiting example of a suitable surface pretreatment solution is a sol-gel, such as those comprising alkoxy-silanes, alkoxy-zirconates, and/or alkoxy-titanates. Alternatively, the substrate may be a nonpretreated substrate, such as a bare substrate, that is not pretreated by a pretreatment solution.

The substrate may optionally be subjected to other treatments prior to coating. For example, the substrate may be cleaned, cleaned and deoxidized, anodized, acid pickled, plasma treated, laser treated, or ion vapor deposition (IVD) treated. These optional treatments may be used on their own or in combination with a pretreatment solution.

A liquid composition may be utilized in an electrocoating layer that is part of a multi-layer coating composite comprising a substrate with various coating layers. The coating layers may optionally include a pretreatment layer, such as a phosphate layer (e.g., zinc phosphate layer) or metal oxide layer (e.g., zirconium oxide layer), an electrocoating layer which results from an aqueous composition, optionally primer layer(s) and suitable topcoat layer(s) (e.g., base coat, clear coat layer, pigmented monocoat, and color-plus-clear composite compositions). It is understood that suitable additional coating layers include any of those known in the art, and each independently may be waterborne, solventborne, in solid particulate form (i.e., a powder coating composition), or in the form of a powder slurry. The additional coating compositions may comprise a film-forming resin, a cross-linking material and, if a colored base coat or monocoat, pigment. The primer layer(s) may optionally be disposed between the electrocoating layer and the topcoat layer(s). Alternatively, the topcoat layer(s) may be omitted such that the composite comprises the electrocoating layer and primer layer(s).

Moreover, the topcoat layer(s) may be applied directly onto the electrodepositable coating layer. In other words, the substrate may lack a primer layer such that the composite comprises the electrocoating layer and topcoat layer(s). For example, a basecoat layer may be applied directly onto at least a portion of the electrodepositable coating layer.

It will also be understood that any of the topcoat layers may be applied onto an underlying layer despite the fact that the underlying layer has not been fully cured. For example, a clearcoat layer may be applied onto a basecoat layer even though the basecoat layer has not been subjected to a curing step (wet-on-wet). Both layers may then be cured during a subsequent curing step thereby eliminating the need to cure the basecoat layer and the clearcoat layer separately.

"Powder" and like terms, as used herein, refers to materials that are in the form of solid particulates, as opposed to materials which are in the liquid form.

Powder coating compositions may be applied by any suitable method. Methods of applying said powder coating compositions will be well known to a person skilled in the art. Suitable application methods include, such as electrodeposition, or applied by ultra corona discharge for example. The powder coating compositions may be applied by ultra corona discharge.

When the substrate is electrically conductive, the powder coating composition is typically electrostatically applied. Electrodeposition generally involves drawing the coating composition from a fluidized bed and propelling it through a corona field. The particles of the coating composition become charged as they pass through the corona field and are attracted to and deposited upon the electrically conductive substrate, which is grounded. As the charged particles begin to build up, the substrate becomes insulated, thus limiting further particle deposition.

The coating compositions may be in the form of a liquid or a powder.

The coating compositions may be in the form of a liquid. The coating compositions may be solvent-borne or aqueous.

The coating compositions may be applied to the substrate by spraying. Thus, the coating compositions may be spray compositions. For the avoidance of doubt, by the term 'spray composition' and like terms as used herein is meant, unless specified otherwise, that the coating is suitable to be applied to a substrate by spraying, i.e. is sprayable.

The coating compositions may be applied to any suitable dry film thickness. The coating compositions may be applied to a dry film thickness from 1 to 100 microns (μm), suitably from 1 to 75 μm, such as from 1 to 50 μm, such as from 1 to 40 μm, such as from 1 to 20 μm, or such as from 1 to 10 μm.

The coating compositions and/or layers deposited from the same, as well as any pretreatment layer, primer layer or topcoat layer, that is substantially free of chromium or chromium-containing compounds means that chromium or chromium-containing compounds are not intentionally added, but may be present in trace amounts, such as because of impurities or unavoidable contamination from the environment. In other words, the amount of material is so small that it does not affect the properties of the composition; this may further include that chromium or chromium-containing compounds are not present in an aqueous or powder composition and/or layers deposited from the same, as well as any pretreatment layer, primer layer or topcoat layer, in such a level that they cause a burden on the environment. The term "substantially free" means that a coating composition and/or layers deposited from the same, as well as any pretreatment layer, primer layer or topcoat layer, contain less than 10 ppm of chromium, based on total solids weight of the composition, the layer, or the layers, respectively, if any at all. The term "essentially free" means that a coating composition and/or layers deposited from the same, as well as any pretreatment layer, primer layer or topcoat layer, contain less than 1 ppm of chromium, based on total solids weight of the composition or the layer, or layers, respectively, if any at all. The term "completely free" means that a coating composition and/or layers comprising the same, as well as any pretreatment layer, primer layer or topcoat layer, contain less than 1 ppb of chromium, based on total solids weight of the composition, the layer, or the layers, respectively, if any at all.

The coating compositions may be cured by any suitable method. The coating composition may be cured by heat curing, radiation curing or by chemical curing, such as by heat curing.

The coating composition may be thermally curable. The coating composition may be heated at an elevated temperature sufficient to cure the coating composition. The coating composition, when heat cured, may be cured at any suitable temperature. Thermally curable coating compositions are cured at elevated temperatures above 25° C. For example, the coating composition may be cured under conditions encompassing a temperature of at least 30° C., at least 40° C., at least 50° C., at least 60° C., at least 70° C., at least 80° C., at least 90° C., at least 100° C., at least 120° C., at least 150° C., at least 180° C., or at least 200° C. Thermally curable coating compositions may be cured at temperatures of 30° C. to 250° C., such as 40° C. to 250° C., 50° C. to 250° C., 60° C. to 250° C., 70° C. to 250° C., 80° C. to 250° C., 90° C. to 250° C., or 100° C. to 250° C.

Where the substrate is a food and/or beverage packaging using a metal substrate, the coating composition, when heat cured, may be cured to a peak metal temperature (PMT) of 150 to 350° C., such as from 175 to 320° C., such as from 190 to 300° C., or such as from 200 to 280° C. For the avoidance of doubt, the term "peak metal temperature", and like terms as used herein, is meant unless specified otherwise the maximum temperature reached by the metal substrate during exposure to a heat during the heat curing process. In other words, the peak metal temperature (PMT) is the maximum temperature reached by the metal substrate and not the temperature which is applied thereto. It will be appreciated by a person skilled in the art that the temperature reached by the metal substrate may be lower than the temperature which is applied thereto or may be substantially equal to the temperature which is applied thereto. The temperature reached by the metal substrate may be lower that the temperature which is applied thereto.

Curing the coating compositions may form a cured continuous or semi-continuous film.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, singular encompasses plural and vice versa. For example, although reference is made herein to "a" phenolic resin, "a" film-forming resin, "a" curing agent, and the like, one or more of each of these and any other components can be used.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

The term "alk" or "alkyl", as used herein unless otherwise defined, relates to saturated hydrocarbon radicals being straight, branched, cyclic or polycyclic moieties or combinations thereof and contain 1 to 20 carbon atoms, such as 1 to 10 carbon atoms, such as 1 to 8 carbon atoms, such as 1 to 6 carbon atoms, or even 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as $—CH_3$, becomes methylene, $—CH_2—$, when represented as an alkylene. Other alkylene groups should be understood accordingly.

The term "alkenyl", as used herein, relates to hydrocarbon radicals having, such as up to 4, double bonds, being straight, branched, cyclic or polycyclic moieties or combinations thereof and containing from 2 to 18 carbon atoms, such as 2 to 10 carbon atoms, such as from 2 to 8 carbon atoms, such as 2 to 6 carbon atoms, or even 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as $—CH\!=\!CH2$, becomes ethenylene, $—CH\!=\!CH—$, when represented as an alkenylene. Other alkenylene groups should be understood accordingly.

The term "alkynyl", as used herein, relates to hydrocarbon radicals having, such as up to 4, triple bonds, being straight, branched, cyclic or polycyclic moieties or combinations thereof and having from 2 to 18 carbon atoms, such as 2 to 10 carbon atoms, such as from 2 to 8 carbon atoms, such as from 2 to 6 carbon atoms, or such as from 2 to 4 carbon atoms. These radicals may be optionally substituted with a hydroxy, chloro, bromo, iodo, cyano, nitro, $OR^{19}$, $OC(O)$ $R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as $—C\!\equiv\!CH$, becomes ethynylene, $—C\!\equiv\!C—$, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

Also, the recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

The terms "comprising", "comprises" and "comprised of" as used herein are synonymous with "including", "includes" or "containing", "contains", and are inclusive or open-ended and do not exclude additional, non-recited members, elements or method steps. Additionally, although the present invention has been described in terms of "comprising", the coating compositions detailed herein may also be described as "consisting essentially of" or "consisting of".

As used herein, the term "and/or," when used in a list of two or more items, means that any one of the listed items can be employed by itself or any combination of two or more of the listed items can be employed. For example, if a list is described as comprising group A, B, and/or C, the list can comprise A alone; B alone; C alone; A and B in combination; A and C in combination, B and C in combination; or A, B, and C in combination.

As used herein, the term "polymer" refers broadly to prepolymers, oligomers and both homopolymers and copolymers. It should be noted that the prefix "poly" refers to two or more.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

ASPECTS

In view of the foregoing, the present invention thus relates in particular, without being limited thereto, to the following aspects:

Aspect 1. A coating composition comprising:
a film-forming resin having a number average molecular weight (Mn) of at least 1000; and
a phenolic resin comprising a reaction product of a reaction mixture comprising:
a phenol group containing compound; and
a glyoxylic acid containing compound; and
wherein the film-forming resin has functional groups which are reactive with the functionality of the phenolic resin, and wherein the coating composition is substantially free of formaldehyde.

Aspect 2. The coating composition of Aspect 1, wherein the composition is thermally curable.

Aspect 3. The coating composition of Aspects 1 or 2, wherein the phenolic resin is self-crosslinkable.

Aspect 4. The coating composition of any of the preceding aspects, wherein the reaction mixture further comprises a monoaldehyde or a ketone.

Aspect 5. The coating composition of any of the preceding aspects, wherein the film-forming resin comprises an epoxy resin, an epoxy mimic resin, a polyether resin, a polyurethane resin, a polyurea resin, a polyester resin, an acrylic resin, and/or a polyolefin resin.

Aspect 6. The coating composition of any of the preceding aspects, wherein the film-forming resin comprises an acrylic polymer.

Aspect 7. The coating composition of any of the preceding aspects, wherein the film-forming resin is present in an amount of greater than 50%, based on the weight of the film-forming resin and the phenolic resin.

Aspect 8. The coating composition of Aspect 7, wherein the film-forming resin is present in an amount of up to 99.5 wt %, based on the total weight of the film-forming resin and the phenolic resin.

Aspect 9. The coating composition of any of the preceding aspects, wherein the phenolic resin is present in an amount of at least 0.5 wt %, based on the total weight of the film-forming resin and the phenolic resin.

Aspect 10. The coating composition of any of the preceding aspects, wherein the glyoxylic acid containing compound comprises glyoxylic acid, acetals, hemiacetals, esters, and/or salts thereof.

Aspect 11. The coating composition of any of the preceding aspects, wherein the phenol group containing compound comprises resorcinol and/or hydroquinone.

Aspect 12. The coating composition of any of the preceding aspects, wherein the phenol group containing compound comprises at least two hydroxyl groups.

Aspect 13. The coating composition of any of the preceding aspects, wherein the molar ratio of the glyoxylic acid containing compound to the phenol group containing compound is less than 2.5:1.

Aspect 14. The coating composition of any of the preceding aspects, wherein the ratio of reactive equivalents of the glyoxylic acid containing compound to the phenol group containing compound is 0.7:1 to 3:1.

Aspect 15. The coating composition of any of the preceding aspects, wherein the phenolic resin has a pH of 6 to 9.

Aspect 16. The coating composition of any of the preceding aspects for application onto a substrate comprising metal, glass, and/or plastic.

Aspect 17. A coated substrate having a surface at least partially coated with the coating composition of any of Aspects 1 to 15.

Aspect 18. A coated metal substrate having a surface at least partially coated with the coating composition of any of Aspects 1 to 15.

Aspect 19. A coated glass substrate having a surface at least partially coated with the coating composition of any of Aspects 1 to 15.

Aspect 20. A coated plastic substrate having a surface at least partially coated with the coating composition of any of Aspects 1 to 15.

Aspect 21. A food and/or beverage container comprising a metal substrate having a surface at least partially coated with the coating composition of any of Aspects 1 to 15.

Aspect 22. The food and/or beverage container of Aspect 21, wherein the surface is a food contacting surface.

Aspect 23. The food and/or beverage container of Aspect 21, wherein the food and/or beverage container is a metal can.

Aspect 24. The food and/or beverage container of Aspect 23, wherein the surface is an interior of the metal can.

Aspect 25. The food and/or beverage container of Aspect 23, wherein the surface is an exterior of the metal can.

Aspect 26. The food and/or beverage container of Aspect 23, wherein the surface is a can end.

Aspect 27. A method of coating a food and/or beverage container, the method comprising:
applying the coating composition of any of Aspects 1 to 15 to at least a portion of a metal substrate prior to or after forming the metal substrate into a food or beverage container or portion thereof; and thermally curing the coating composition.

Aspect 28. The method of Aspect 19, wherein the metal substrate is formed into a food or beverage container or portion thereof prior to or after the metal substrate is coated with the coating composition.

Aspect 29. A monobloc aerosol can and/or tube comprising a metal substrate having a surface at least partially coated with the coating composition of any of Aspects 1 to 15. Aspect 30. A method of coating a monobloc aerosol can and/or tube, the method comprising:
applying the coating composition of any of Aspects 1 to 15 to at least a portion of a metal substrate prior to or after forming the metal substrate into a monobloc aerosol can and/or tube or portion thereof; and thermally curing the coating composition.

Aspect 31. A method of coating a substrate, the method comprising:
applying the coating composition of any of Aspects 1 to 15 to at least a portion of a substrate; and thermally curing the coating composition.

All of the features contained herein may be combined with any of the above aspects in any combination.

For a better understanding of the invention, and to show how embodiments of the same may be carried into effect, reference will now be made, by way of example, to the following examples.

EXAMPLES

Crosslinker Example 1.1

Resorcinol:Glyoxylic Acid (Ratio 1:1.25 by Equivalent, 1:1.8 by Mol)

Resorcinol (231.2 g) and water (231.3 g) were charged to a vessel and mixed until homogeneous. Glyoxylic acid (583.2 g, 50% solution in water) was added to the resorcinol solution, and the mixture was stirred. The mixture was then neutralized to a pH of 7.5 by slowly adding dimethylethanolamine with the use of a water bath to keep the mixture at ambient temperature. The resin is shelf stable under ambient conditions for several weeks. When tested according to the self-crosslinkability test described below, this resin yielded a continuous film with >120 solvent double rubs.

Crosslinker Example 1.2

Resorcinol:Glyoxylic Acid (Ratio 1:1.1 by Equivalent, 1:1.7 by Mol)

Resorcinol (7.3 g) and water (7.3 g) were charged to a vessel and mixed until homogeneous. Glyoxylic acid (20.7 g, 50% solution in water) was added to the resorcinol solution, and the mixture was stirred. The mixture was then neutralized to a pH of 7.5 by slowly adding dimethylethanolamine with the use of a water bath to keep the mixture at ambient temperature. The resin is shelf stable under ambient conditions for several weeks. When tested according to the described self-crosslinkability test, this resin yielded a continuous film with >120 solvent double rubs.

Crosslinker Example 1.3

Resorcinol:Glyoxylic Acid (Ratio 1:1.4 by Equivalent, 1:2.1 by Mol)

Resorcinol (7.3 g) and water (7.3 g) were charged to a vessel and mixed until homogeneous. Glyoxylic acid (10.4 g, 50% solution in water) was added to the resorcinol solution, and the mixture was stirred. The mixture was then neutralized to a pH of 7.5 by slowly adding dimethylethanolamine with the use of a water bath to keep the mixture at ambient temperature. The resin is shelf stable under ambient conditions for several weeks. When tested according to the described self-crosslinkability test, this resin yielded a continuous film with >120 solvent double rubs.

Crosslinker Example 1.4

Resorcinol:Glyoxylic Acid (Ratio 1:0.9 by Equivalent, 1:1.4 by Mol)

Resorcinol (9.2 g) and water (9.2 g) were charged to a vessel and mixed until homogeneous. Glyoxylic acid (16.7 g, 50% solution in water) was added to the resorcinol solution, and the mixture was stirred. The mixture was then neutralized to a pH of 7.5 by slowly adding dimethylethanolamine with the use of a water bath to keep the mixture at ambient temperature. The resin is shelf stable under ambient conditions for several weeks. When tested according to the described self-crosslinkability test, this resin yielded a continuous film with >120 solvent double rubs.

Crosslinker Example 2

Hydroquinone:Salicylaldehyde+Glyoxylic Acid (Ratio 1:1.2 by Equivalent, 1:1.4 by Mol)

Hydroquinone (28 g), salicylaldehyde (17 g), and water (57 g) were charged to a four-neck flask under a nitrogen atmosphere with adequate stirring. Glyoxylic acid (50% solution in water, 31 g) and dimethylethanolamine (19 g) were mixed in a separate vessel, maintaining the mixture at ambient temperature by aid of an ice bath. The resulting glyoxylic acid/dimethylethanolamine blend was charged to the hydroquinone solution over 5 min. Sodium hydroxide (50% solution in water, 1 g) was then charged over 5 min, and the resulting mixture was heated to 100° C. The mixture was maintained at a temperature of 100° C. for 5 hr to yield a hydroquinone/salicylaldehyde/glyoxylic acid resin. The resin a non-volatile content of 26.28%. When tested according to the described self-crosslinkability test, this resin yielded a continuous film with 65 solvent double rubs.

Crosslinker Example 3

Hydroquinone:Glyoxylic Acid (Ratio 1:1.1 by Equivalent, 1:1.65 by Mol)

Hydroquinone (188 g) and water (137 g) were charged to a four-neck flask under a nitrogen atmosphere with adequate stirring. Glyoxylic acid (50% solution in water, 417 g) and dimethylethanolamine (252 g) were mixed in a separate vessel, maintaining the mixture at ambient temperature by aid of an ice bath. The resulting glyoxylic acid/dimethylethanolamine blend was charged to the hydroquinone solution over 5 min. Sodium hydroxide (50% solution in water, 6.8 g) was then charged over 5 min, and the resulting mixture was heated to 100° C. The mixture was maintained at a temperature of 100° C. for 5 hr to yield a hydroquinone/glyoxylic acid resin. The resin a non-volatile content of 35.8%. When tested according to the described self-crosslinkability test, this resin yielded a continuous film with 45 solvent double rubs.

Crosslinker Example 4

Naphthol:Glyoxylic Acid (Ratio 1:1.2 by Equivalent, 1:1.5 by Mol)

2-Naphthol (26.0 g) and propylene glycol methyl ether (30.0 g) were charged to a four-neck flask under a nitrogen atmosphere with adequate stirring. In a separate vessel, propylene glycol methyl ether (12.5 g) and glyoxylic acid monohydrate (37.0 g) were mixed until homogeneous. Dimethylethanolamine (36.1 g) was added over 10 min to the glyoxylic acid solution, maintaining the mixture at ambient temperature by aid of an ice bath. The resulting glyoxylic acid/dimethylethanolamine blend was charged to the naphthol solution over 5 min. Sodium hydroxide (1 M solution in propylene glycol methyl ether, 8.3 g) was then charged over 5 min, and the resulting mixture was heated to 100° C. The mixture was maintained at 100° C. for 5 hr to yield a 2-naphthol/glyoxylic acid resin. The resin had a non-volatile content of 30.1%. When tested according to the described self-crosslinkability test, this resin yielded a continuous film with 22 solvent double rubs.

Comparative Example 1

Phenol:Glyoxylic Acid (Ratio 1:1.1 by Equivalent, 1:1.4 by Mol)

Phenol (94 g), glyoxylic acid (50% solution in water, 207 g), and water (48 g) were charged to a four-neck flask under a nitrogen atmosphere with adequate stirring. The mixture was heated to 80° C., at which point methanesulfonic acid (70% solution in water, 5.7 g) and water (5.0 g) were added over 5 min. The mixture was then brought to reflux, which was maintained for 8 hr. The resulting phenol/glyoxylic acid resin had a non-volatile content of 49.8%. When tested according to the self-crosslinkability test described below, this resin yielded a continuous film with 3 solvent double rubs.

Comparative Example 2

Hydroquinone:Glyoxal+Glyoxylic Acid (Ratio 1:1.2 by Equivalent, 1:1.9 by Mol)

Hydroquinone (22 g) and glyoxal (40% solution in water, 16 g) were charged to a four-neck flask under a nitrogen atmosphere with adequate stirring. Glyoxylic acid (50% solution in water, 33 g) and dimethylethanolamine (40 g) were mixed in a separate vessel, maintaining the mixture at ambient temperature by aid of an ice bath. The resulting glyoxylic acid/dimethylethanolamine blend was charged to the the hydroquinone/glyoxal solution over 5 min. Sodium hydroxide (10% solution in water, 4 g) was then charged over 5 min, and the resulting mixture was heated to 100° C. The mixture was maintained at 100° C. for 5 hr to yield a hydroquinone/glyoxal/glyoxylic acid resin. When tested according to the described self-crosslinkability test, this resin yielded a continuous film with 2 solvent double rubs.

Comparative Example 3

Resorcinol:Benzaldehyde (Ratio 1:1.8 by Equivalent, 1:1.8 by Mol)

Resorcinol (4.6 g) and butanol (13.0 g) were charged to a vessel and mixed until homogeneous. Benzaldehyde (8.4 g) was added to the resorcinol solution, and the mixture was stirred for 1 hour yield the resorcinol/glyoxylic acid resin. When tested according to the described self-crosslinkability test, this resin did not yield a continuous film.

Comparative Crosslinker Example 4

Resorcinol:Glyoxylic Acid (Ratio 1:0.6 by Equivalent, 1:0.9 by Mol)

Resorcinol (9.2 g) and water (9.2 g) were charged to a vessel and mixed until homogeneous. Glyoxylic acid (11.1 g, 50% solution in water) was added to the resorcinol solution, and the mixture was stirred. The mixture was then neutralized to a pH of 7.5 by slowly adding dimethylethanolamine with the use of a water bath to keep the mixture at ambient temperature. The resin is shelf stable under ambient conditions for several weeks. When tested according to the described self-crosslinkability test, this resin yielded a continuous film with 0 solvent double rubs.

Non-volatile content of resins above was determined by adding an aliquot of resin (0.5±0.1 g) to an aluminum weighing dish (Fisherbrand, 42 mL, 60×15 mm), followed by an appropriate solvent (5 mL). A duplicate sample was then prepared. The mixtures were agitated, optionally with gentle heating, to dissolve or disperse the resin. The solutions/dispersions were then placed into a forced draft oven and heated for 1 hr at 150° C. Resin masses were obtained after heating, and differences in mass were used to calculate the percentage of non-volatile material. An average of the duplicate samples was taken as the non-volatile content.

Coating Composition Examples

Coating composition example 1, 1.5, 2 and 3 was prepared according to the formulation in Table 1, whereby component 2 was added gradually to component 1 and mixed under stirring. The mixture was stirred until good mixing was achieved. Then, the solvents, component 3 and 4 were added sequentially with the mixture and stirred for a few minutes between each addition to allow for good incorporation to be achieved. Then, component 5 was added gradually to adjust the pH and viscosity.

TABLE 1

| | | | | | |
|---|---|---|---|---|---|
| | Formulation of coating examples | | | | |
| | | | Examples | | |
| | Component | 1 | 1.5 | 2 | 3 (Comparative example) |
| 1 | WB polyol * | 44.3 | X | X | X |
| 1 | WB latex | X | 78 | 78 | 100 |
| 2 | Crosslinker example 1 | 11.3 | 11.6 | X | X |
| 2 | Crosslinker example 2 | X | X | 14.9 | X |
| 3 | Butanol/butyl cellosolve/amyl alcohol 56/21/22 | 0 | 17.1 | 11.7 | 11.3 |
| 4 | DI Water | 45.7 | 12.3 | 10.3 | 12.5 |
| 5 | DMEA | 0 | 0.43 | 0.4 | .5 |
| | Total | 101.3 | 119.4 | 115.3 | 124.3 |
| | % solids | 25.6 | 21.8 | 22.6 | 20.1 |

* Joncryl OH 8312 commercially available from BASF.

The properties of the coatings were then tested by the following methods. The results are shown in Table 2.

Self-Crosslinkability Test

Crosslinker examples were tested (100% crosslinker component) by the following method and evaluated using the following MEK double rubs testing method.

Test Methods

Test panel preparation: Coated panels were prepared by coating flat aluminum cans, tin substrates and sodalime glass substrates using a bar coater. The dry film weight for the coating layer was 4 to 10 mg/cm$^2$. After application, the coated panels were baked in a box oven at 215° C. for 1 minute 45 seconds or 5 minutes.

MEK double rubs: Solvent resistance of the coatings were evaluated using a modified method based on ASTM D 5402-06. For this test, 2 squares of 4 by 4 inch non-sterile Gauze Spongers with 12 PLY (by DUKAL CORPORATION, REF 4122) were attached to the head of a hammer and then dipped to dripping wet in methyl ethyl ketone (MEK) solvent. The hammer was then pushed back and forth (1 double rub) over the coating sample using only the weight of the hammer (~1900 g) for downforce. The gauze was rewetted every 25 double rubs and the rubbing continued until there was visible breakthrough of the coating, exposing the metal substrate.

Wedge Bend Test: A 10 cm×4 cm coated panel was bent on a 6 mm steel rod to form a U-shaped strip 10 cm long and 2 cm wide. The U-shaped strip was then placed onto a metal block with a built in tapered recess. A 2 kg weight was dropped onto the recessed block containing the U-shaped strip from a height of 60 cm in order to from a wedge. The test piece was then immersed in a copper sulphate (CuSO$_4$) solution acidified with hydrochloric acid (HCl) for 2 minutes, followed by rinsing with tap water. The sample was then carefully dried by blotting any residual water with tissue paper. The length of coating without any fracture was measured. The result was quoted in mm passed. The wedge bends were tested in triplicate and the average value was quoted.

Acetic Acid Sterilization: One set of coated panels cut into 10 cm×5 cm panels were placed in a container containing 3% acetic acid such that the panel was submerged in the solution. The container was then placed in an autoclave and processed at 100° C. for 30 minutes. After this time, the panels were assessed by the following methods:

Gloss surface modification: The processed panels were assessed visually for gloss surface modification and rated on a scale of 0 to 5. A score of 0 corresponds to no damage/defect and a score of 5 corresponds to severe damage/defect.

Adhesion: The processed panels were tested for coating adhesion to the aluminium substrate using a BYK Cross-Cut Tester Kit #5127 (commercially available from BYK-Gardner GmbH) in accordance with ASTM D3359. The cutter spacing was 1.5 mm and Scotch 610 tape was used. The results were rated on a scale of 0 to 5. Grade 0 corresponds to good adhesion with no removal of coating and grade 5 to complete loss of adhesion.

1% Joy test: One set of coated panels cut into 10 cm×5 cm panels were placed in a container containing 1% Joy detergent such that the panel was submerged in the solution. The container was then placed in an autoclave and processed at 82° C. for 45 minutes. After this time, the panels were assessed the methods above (gloss and adhesion).

TABLE 2

Test Results

|  | Example 1 | Example 1.5 | Example 2 | Example 3 |
|---|---|---|---|---|
| Cure Time (min.) | 5 | 1.75 | 5 | 1.75 |
| Film weight (mg/cm2) | 9.3 | 4.1 | 4.6 | 4.6 |
| MEK double rubs | 8 | 2 | 3 | 4 |
| Wedge bend (no rust) | 70 | 88 | 77 | 92 |
| Wedge bend (peppering) | 61 | 71 | 72 | 74 |
| 1% Joy appearance | Light blush | Light blush | No blush | No blush |
| 1% Joy cross hatch | 0 | 0 | 0 | 0 |
| 3% Acetic acid appearance | No blush | No blush | No blush | No blush |
| 3% Acetic acid adhesion | 0 | 1 | 5 | 3 |

Crosslinker Stability Test

Crosslinker Example 1.1 and a formaldehyde containing commercial phenolic crosslinker (CURAPHEN 40-804 W75 available commercially from Bitrez) were stored at room temperature and tested using the following viscosity measurement method at each consecutive days.

TABLE 3

Stability

Crosslinker

| Day | Crosslinker Example 1 (centipoise) | Formaldehyde containing commercial phenolic crosslinker (centipoise) |
|---|---|---|
| 0 | 110 | 795 |
| 1 | 112.6 | 869 |
| 2 | 108.2 | 953 |
| 3 | 112.6 | 998 |
| 4 | 117 | 1135 |
| 5 | 113.5 | — |
| 6 | 117.9 | — |

TABLE 3-continued

Stability

Crosslinker

| Day | Crosslinker Example 1 (centipoise) | Formaldehyde containing commercial phenolic crosslinker (centipoise) |
|---|---|---|
| 7 | 121.4 | 1001 |
| 8 | 124.1 | 1206 |
| 9 | 119.7 | 1404 |

As shown in Table 3, viscosity of the commercial crosslinker increased by 77% whereas viscosity of crosslinker example 1.1 had almost no increase (6%) after 9 days of storage at room temperature.

Viscosity Test: Viscosity of crosslinkers were measured using Brookfield Engineering Lab CAP 2000+ viscometer at room temperature.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coating composition for a substrate comprising:
   a film-forming resin having a number average molecular weight (Mn) of at least 1000, wherein the film-forming resin comprises a core/shell acrylic latex material, or a polyester graft acrylic resin, or a combination thereof; and
   a phenolic resin comprising a reaction product of a reaction mixture comprising:
      a phenol group containing compound; and
      a glyoxylic acid containing compound; and
   wherein the film-forming resin has functional groups which are reactive with the functionality of the phenolic resin, wherein the coating composition comprises greater than 50% of the film-forming resin, based on the weight of the film-forming resin and the phenolic resin, and wherein the coating composition is substantially free of formaldehyde.

2. The coating composition of claim 1, wherein the composition is thermally curable.

3. The coating composition of claim 1, wherein the phenolic resin is self-crosslinkable.

4. The coating composition of claim 1, wherein the reaction mixture further comprises a monoaldehyde or a ketone.

5. The coating composition of claim 1, wherein the film-forming resin comprises a core/shell acrylic latex material.

6. The coating composition of claim 1, wherein the film-forming resin comprises a polyester graft acrylic resin.

7. The coating composition of claim 1, wherein the film-forming resin is present in an amount of up to 99.5 wt %, based on the total weight of the film-forming resin and the phenolic resin.

8. The coating composition of claim 1, wherein the phenolic resin is present in an amount of at least 0.5 wt %, based on the total weight of the film-forming resin and the phenolic resin.

9. The coating composition of claim 1, wherein the glyoxylic acid containing compound comprises glyoxylic acid, acetals, hemiacetals, esters, and/or salts thereof.

10. The coating composition of claim 1, wherein the phenol group containing compound comprises resorcinol and/or hydroquinone.

11. The coating composition of claim 1, wherein the phenol group containing compound comprises at least two hydroxyl groups.

12. The coating composition of claim 1, wherein the molar ratio of the glyoxylic acid containing compound to the phenol group containing compound is 1:1 to 3:1.

13. The coating composition of claim 1, wherein the phenolic resin has a pH of 6 to 9.

14. A coated substrate having a surface at least partially coated with the coating composition of claim 1.

15. A food and/or beverage container comprising a metal substrate having a surface at least partially coated with the coating composition of claim 1.

16. A monobloc aerosol can and/or tube comprising a metal substrate having a surface at least partially coated with the coating composition of claim 1.

17. A coating composition comprising:

50% to 99.5% of a film-forming resin comprising a core/shell acrylic latex material, or a polyester graft acrylic resin, or a combination thereof; and 0.5% to 50% of a phenolic resin;

wherein percentages of the film-forming resin and the phenolic resin are based on the weight of the film-forming resin and the phenolic resin;

wherein the coating composition is substantially free of formaldehyde; and wherein the phenolic resin comprises a reaction product of a reaction mixture comprising:

a phenol group containing compound comprising at least two hydroxyl groups; and a glyoxylic acid containing compound.

18. The coating composition of claim 17, wherein the reaction mixture further comprises a monoaldehyde or a ketone.

19. The coating composition of claim 17, wherein the glyoxylic acid containing compound comprises glyoxylic acid, acetals, hemiacetals, esters, and/or salts thereof; and wherein the phenol group containing compound comprises resorcinol and/or hydroquinone.

20. The coating composition of claim 17, wherein the molar ratio of the glyoxylic acid containing compound to the phenol group containing compound is 1:1 to 3:1.

21. The coating composition of claim 17, wherein the film-forming resin comprises a core/shell acrylic latex material.

* * * * *